(12) United States Patent
Olson et al.

(10) Patent No.: US 11,011,190 B2
(45) Date of Patent: May 18, 2021

(54) MAGNETIC WRITE HEAD WITH WRITE-FIELD ENHANCEMENT STRUCTURE INCLUDING A MAGNETIC NOTCH

(71) Applicant: Western Digital Technologies, Inc., San Jose, CA (US)

(72) Inventors: James Terrence Olson, Santa Cruz, CA (US); Hiroyuki Hoshiya, Odawara (JP); Alexander Goncharov, Morgan Hill, CA (US); Masato Shiimoto, Fujisawa (JP); Mikito Sugiyama, Odawara (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/857,423

(22) Filed: Apr. 24, 2020

(65) Prior Publication Data

US 2020/0342899 A1    Oct. 29, 2020

Related U.S. Application Data

(60) Provisional application No. 62/838,229, filed on Apr. 24, 2019.

(51) Int. Cl.
*G11B 5/31*    (2006.01)
*G11B 5/127*    (2006.01)
(Continued)

(52) U.S. Cl.
CPC .............. *G11B 5/1278* (2013.01); *G11B 5/02* (2013.01); *G11B 5/23* (2013.01); *G11B 5/314* (2013.01);
(Continued)

(58) Field of Classification Search
None
See application file for complete search history.

(56) References Cited

U.S. PATENT DOCUMENTS 6,201,653 B1    3/2001    Contreras et al.
6,614,554 B1    9/2003    Yokoi
(Continued)

FOREIGN PATENT DOCUMENTS

CN    104835510 B    11/2017
JP    2013047999 A    3/2013
(Continued)

OTHER PUBLICATIONS

Center for Memory and Recording Research, "Research Review & Advisory Council Meeting Program," Oct. 8-9, 2015.
(Continued)

*Primary Examiner* — Jefferson A Evans
(74) *Attorney, Agent, or Firm* — Jacobsen IP Law; Krista S. Jacobsen

(57) ABSTRACT

A write head for a data storage device comprises a main pole, a trailing shield, and a write-field enhancement structure disposed in a write gap between the main pole and the trailing shield. The write-field enhancement structure comprises a non-magnetic spacer, a non-magnetic layer, and a magnetic DC-field-generation (DFG) layer. The DFG layer is sandwiched between the non-magnetic layer and the non-magnetic spacer. The write head also includes at least one magnetic notch adjacent to at least one of the main pole or the trailing shield. The non-magnetic spacer is adjacent to a magnetic notch. Some embodiments include multiple magnetic notches. Also disclosed are data storage devices comprising such write heads.

24 Claims, 18 Drawing Sheets

(51) Int. Cl.
   *G11B 5/23* (2006.01)
   *G11B 5/714* (2006.01)
   *G11B 5/39* (2006.01)
   *G11B 5/66* (2006.01)
   *G11B 5/455* (2006.01)
   *G11B 5/02* (2006.01)

(52) U.S. Cl.
   CPC ............ *G11B 5/315* (2013.01); *G11B 5/3133* (2013.01); *G11B 5/3987* (2013.01); *G11B 5/4555* (2013.01); *G11B 5/66* (2013.01); *G11B 5/714* (2013.01)

(56) References Cited

U.S. PATENT DOCUMENTS

| | | | |
|---|---|---|---|
| 6,813,115 B2 | 11/2004 | Van Der Heijden et al. | |
| 7,310,197 B2 | 12/2007 | Baumgart et al. | |
| 7,397,633 B2 | 7/2008 | Kue et al. | |
| 7,538,977 B2 | 5/2009 | Gider et al. | |
| 7,724,469 B2 | 5/2010 | Gao et al. | |
| 7,869,160 B1 | 1/2011 | Pan et al. | |
| 7,982,996 B2 | 7/2011 | Smith et al. | |
| 8,049,984 B2 | 11/2011 | Contreras et al. | |
| 8,116,031 B2 | 2/2012 | Alex et al. | |
| 8,174,798 B2 | 5/2012 | Nagasawa et al. | |
| 8,179,633 B2 | 5/2012 | Contreras et al. | |
| 8,203,192 B2 | 6/2012 | Gao et al. | |
| 8,208,219 B2 | 6/2012 | Zhang et al. | |
| 8,238,059 B1 | 8/2012 | Tang et al. | |
| 8,274,811 B2 | 9/2012 | Zhang et al. | |
| 8,339,736 B2 | 12/2012 | Gao et al. | |
| 8,351,155 B2 | 1/2013 | Contreras et al. | |
| 8,400,734 B2 | 3/2013 | Yamada et al. | |
| 8,422,159 B2 | 4/2013 | Gao et al. | |
| 8,446,690 B2 | 5/2013 | Alex et al. | |
| 8,467,149 B2 | 6/2013 | Takeo et al. | |
| 8,472,135 B1 | 6/2013 | Kusukawa et al. | |
| 8,472,140 B2 | 6/2013 | Yamada et al. | |
| 8,537,497 B2 | 9/2013 | Nagasaka et al. | |
| 8,553,346 B2 | 10/2013 | Braganca et al. | |
| 8,564,903 B2 | 10/2013 | Min et al. | |
| 8,570,684 B1 | 10/2013 | Contreras et al. | |
| 8,582,240 B1 | 11/2013 | Chen et al. | |
| 8,599,506 B2 | 12/2013 | Contreras et al. | |
| 8,654,465 B2 | 2/2014 | Braganca et al. | |
| 8,654,480 B2 | 2/2014 | Shimizu et al. | |
| 8,724,262 B1 | 5/2014 | Koui | |
| 8,755,153 B2 | 6/2014 | Kudo et al. | |
| 8,797,693 B1 | 8/2014 | Furukawa et al. | |
| 8,824,104 B1 | 9/2014 | Koui et al. | |
| 8,879,205 B2 | 11/2014 | Shiimoto et al. | |
| 8,896,973 B2 | 11/2014 | Nagasawa et al. | |
| 8,917,465 B1 | 12/2014 | Contreras et al. | |
| 8,953,273 B1 | 2/2015 | Funayama | |
| 9,001,444 B1 | 4/2015 | Contreras et al. | |
| 9,007,722 B2 | 4/2015 | Shimizu et al. | |
| 9,007,723 B1 | 4/2015 | Igarashi et al. | |
| 9,042,051 B2 | 5/2015 | Zeng et al. | |
| 9,047,888 B2 | 6/2015 | Katada et al. | |
| 9,064,508 B1 | 6/2015 | Shiimoto et al. | |
| 9,099,128 B1 | 8/2015 | Contreras et al. | |
| 9,142,227 B1 | 9/2015 | Etoh et al. | |
| 9,202,528 B2 | 12/2015 | Furukawa et al. | |
| 9,230,569 B1 | 1/2016 | Shimoto et al. | |
| 9,230,571 B1 | 1/2016 | Chen et al. | |
| 9,275,672 B2 | 3/2016 | Shiroishi et al. | |
| 9,318,131 B2 | 4/2016 | Tian et al. | |
| 9,330,691 B1 | 5/2016 | Narita et al. | |
| 9,355,657 B1 | 5/2016 | Aoyama et al. | |
| 9,355,668 B2 | 5/2016 | Nishida et al. | |
| 9,368,135 B2 | 6/2016 | Gao | |
| 9,378,759 B2 | 6/2016 | Nagasaka et al. | |
| 9,390,734 B2 | 7/2016 | Gao | |
| 9,679,587 B2 | 6/2017 | Taguchi | |
| 9,805,746 B1 | 10/2017 | Okamura et al. | |
| 9,881,637 B1 | 1/2018 | Wilson et al. | |
| 10,121,497 B1 | 11/2018 | Takahashi et al. | |
| 10,135,392 B2 | 11/2018 | Wei et al. | |
| 10,186,284 B2 | 1/2019 | Narita et al. | |
| 10,236,021 B2 | 3/2019 | Narita et al. | |
| 10,276,193 B2 | 4/2019 | Narita et al. | |
| 10,325,618 B1 | 6/2019 | Wu et al. | |
| 10,366,714 B1 | 7/2019 | Olson et al. | |
| 10,388,305 B1 | 8/2019 | Albuquerque et al. | |
| 10,546,603 B2 | 1/2020 | Olson et al. | |
| 10,643,642 B2* | 5/2020 | De Albuquerque | G11B 5/09 |
| 10,699,731 B1* | 6/2020 | Wu | G11B 5/4826 |
| 10,811,039 B2 | 10/2020 | Olson et al. | |
| 10,937,450 B1* | 3/2021 | Kawasaki | G11B 5/314 |
| 2002/0130658 A1 | 9/2002 | Abe | |
| 2006/0067006 A1 | 3/2006 | Takagishi et al. | |
| 2007/0195453 A1 | 8/2007 | Kameda et al. | |
| 2008/0212239 A1 | 9/2008 | Kawato et al. | |
| 2008/0304176 A1 | 12/2008 | Takagishi et al. | |
| 2009/0052095 A1* | 2/2009 | Yamada | G11B 5/3146 360/324 |
| 2009/0059423 A1 | 3/2009 | Yamada et al. | |
| 2009/0080106 A1 | 3/2009 | Shimizu et al. | |
| 2009/0310244 A1 | 12/2009 | Shimazawa et al. | |
| 2010/0091623 A1 | 4/2010 | Tsuyama | |
| 2010/0321825 A1* | 12/2010 | Nazarov | G11B 5/1278 360/125.02 |
| 2011/0134561 A1 | 6/2011 | Smith et al. | |
| 2011/0216435 A1* | 9/2011 | Shiimoto | G11B 5/02 360/59 |
| 2011/0279921 A1* | 11/2011 | Zhang | G11C 11/161 360/59 |
| 2011/0310510 A1 | 12/2011 | Anagawa et al. | |
| 2012/0002331 A1 | 1/2012 | Oikawa et al. | |
| 2012/0113542 A1 | 5/2012 | Igarashi et al. | |
| 2012/0147502 A1* | 6/2012 | Udo | G11B 5/1278 360/125.12 |
| 2012/0224283 A1 | 9/2012 | Sato et al. | |
| 2012/0243127 A1 | 9/2012 | Iwasaki et al. | |
| 2012/0275061 A1 | 11/2012 | Takagishi et al. | |
| 2013/0050869 A1 | 2/2013 | Nagasaka et al. | |
| 2013/0229895 A1 | 9/2013 | Shiroishi et al. | |
| 2013/0235485 A1 | 9/2013 | Livshitz et al. | |
| 2013/0250456 A1 | 9/2013 | Yamada et al. | |
| 2013/0258514 A1 | 10/2013 | Kobayashi et al. | |
| 2014/0063648 A1 | 3/2014 | Shiroishi et al. | |
| 2014/0104724 A1 | 4/2014 | Shiroishi et al. | |
| 2014/0139952 A1 | 5/2014 | Takeo et al. | |
| 2014/0146420 A1 | 5/2014 | Shimizu et al. | |
| 2014/0168824 A1 | 6/2014 | Ju et al. | |
| 2014/0177092 A1 | 6/2014 | Katada et al. | |
| 2014/0177100 A1 | 6/2014 | Sugiyama et al. | |
| 2014/0268428 A1 | 9/2014 | Dimitrov et al. | |
| 2014/0269235 A1 | 9/2014 | Gong et al. | |
| 2015/0002963 A1 | 1/2015 | Tian et al. | |
| 2015/0092292 A1 | 4/2015 | Furukawa et al. | |
| 2016/0027455 A1 | 1/2016 | Kudo et al. | |
| 2016/0027456 A1 | 1/2016 | Gao | |
| 2016/0035373 A1 | 2/2016 | Takagishi et al. | |
| 2016/0035375 A1 | 2/2016 | Gao | |
| 2016/0055866 A1 | 2/2016 | Le et al. | |
| 2016/0148627 A1 | 5/2016 | Nagasaka et al. | |
| 2016/0180906 A1 | 6/2016 | Kudo et al. | |
| 2017/0148474 A1 | 5/2017 | Okamura et al. | |
| 2017/0236537 A1 | 8/2017 | Murakami et al. | |
| 2018/0252780 A1 | 9/2018 | Iwasaki et al. | |
| 2018/0261241 A1 | 9/2018 | Narita et al. | |
| 2018/0268848 A1 | 9/2018 | Narita et al. | |
| 2019/0088274 A1 | 3/2019 | Narita et al. | |
| 2019/0088275 A1 | 3/2019 | Narita et al. | |
| 2020/0176022 A1* | 6/2020 | Li | G11B 5/21 |

FOREIGN PATENT DOCUMENTS

| | | |
|---|---|---|
| JP | 2013251042 A | 12/2013 |
| JP | 2014130672 A | 7/2014 |
| JP | 2015011745 A | 1/2015 |

(56) References Cited

FOREIGN PATENT DOCUMENTS

| | | |
|---|---|---|
| JP | 2014081981 B | 2/2017 |
| JP | 2018146314 A | 9/2018 |
| JP | 2018147540 A | 9/2018 |
| JP | 2018158709 A | 10/2018 |
| WO | 2015126326 A1 | 8/2015 |

OTHER PUBLICATIONS

Mike Mallary, et al., "Head and Media Challenges for 3 Tb/in^2 Microwave-Assisted Magnetic Recording," IEEE Transactions on Magnetics, vol. 5, Iss. 7, Jul. 2014.
Takuto Katayama, et al., "Micromagnetic model analysis of integrated single-pole-type head with titled spin-torque pscillator for high-frequency microwave-assisted magnetic recording,"J. Appl. Phys. 117, 17C503
Yasushi Kanai, et al., "Micromagnetic Simulation of Spin-Torque Oscillator for Microwave-Assisted Magnetic Recording—Interaction Between Write Head and STO and Optimum Injected Current,"IEEE Transaction Magnetics, vol. 52, Issue 7, Jul. 2016.
U.S. Appl. No. 16/748,881, Olsen et al, Jan. 22, 2020.

\* cited by examiner

MAGNETIC WRITE HEAD WITH WRITE-FIELD ENHANCEMENT STRUCTURE INCLUDING A MAGNETIC NOTCH

CROSS-REFERENCE TO RELATED APPLICATIONS

This application claims the benefit of, and hereby incorporates by reference in its entirety for all purposes, U.S. provisional patent application No. 62/838,229, filed Apr. 24, 2019 and entitled "DATA STORAGE DEVICE WITH MAGNETIC DC FIELD GENERATION LAYER".

BACKGROUND

Magnetic storage systems, such as hard disk drives, are used to store large amounts of information. A magnetic head in a magnetic storage system typically includes a read/write transducer for retrieving and storing magnetically encoded information on a magnetic recording medium, such as a disk.

The ability to increase the storage capacity in magnetic recording is an ongoing concern. As the amount of information to be stored on the magnetic recording medium continues to increase, demands for higher-density recording also continue to increase. High areal densities can be obtained in a perpendicular magnetic recording (PMR) system by increasing the linear density (i.e., the number of bits written in the down-track direction) and/or the track density (i.e., the widths of the tracks). Thus, written bits must become narrower (i.e., in the cross-track direction) and shorter (i.e., in the down-track direction).

Writing shorter bits requires a larger write field gradient. Ideally, the write field gradient is a step, that is, an infinite slope of the field gradient, at the dynamic coercivity of the recording medium being used to enable shorter bits to be written. One way to increase the write field gradient is to reduce the write gap, but doing so reduces the write field. Likewise, for conventional perpendicular magnetic recording, the need to increase track density requires the writer to be narrower, which reduces both the write field and the write field gradient.

Thus, recording bits that are both narrower and shorter raises a fundamental problem: narrower bits require a narrower writer, which reduces the write field magnitude and gradient, whereas the shorter bits require larger gradients and at least no degradation in field magnitude. This problem has led to various proposed alternative magnetic recording approaches and technologies, such as shingled magnetic recording (SMR) and heat-assisted magnetic recording (HAMR).

U.S. Pat. No. 7,538,977 proposes to place a diamagnetic material in the write gap. The primary disadvantage of this approach is the absence of readily-available materials that have sufficient performance at room temperatures. A superconductor may be needed.

Another proposed approach is microwave-assisted magnetic recording (MAMR). In MAMR systems, a spin-torque oscillator (STO) comprising a field-generation layer (FGL) and spin-polarization layer (SPL) is placed within in the write gap. The write head generates a write field that, beneath the main pole, is substantially perpendicular to the magnetic recording layer, and the STO generates a high-frequency auxiliary field to the recording layer. Ideally, the auxiliary field has a frequency close to the resonance frequency of the magnetic grains in the recording layer to facilitate the switching of the magnetization of the grains. As a consequence, the oscillating field of the STO's FGL resonates with the media and provides strong writing despite having a narrow writer.

Although the theory of MAMR is understood, in practice it may be difficult to fabricate a STO structure that has sufficiently stable oscillations at a frequency appropriate for a media, which generally has a narrow range of frequencies to which it responds. For example, in many cases, the FGL's frequency is too low to resonate with the media, or the FGL's frequency is within the proper range to resonate with the media, but the oscillations are unstable. Moreover, the SPL-plus-FGL structure of the STO may be difficult to build into high-gradient, but narrow, write gaps. In addition, the use of MAMR requires a joint optimization of both the writer and the media, which may be complicated, time-consuming, and/or expensive.

Thus, there is an ongoing need for a narrow, stable, more-easily-fabricated writer that provides adequate write field and gradient to enable high-density magnetic recording without requiring a joint optimization of the writer and media.

SUMMARY

This summary represents non-limiting embodiments of the disclosure.

Disclosed herein are data storage devices and methods of writing data to a magnetic recording medium of a data storage device.

In some embodiments, a write head for a data storage device comprises a main pole, a trailing shield, and a write-field enhancement structure disposed in a write gap between the main pole and the trailing shield. The write-field enhancement structure may comprise a magnetic notch, a non-magnetic spacer, a non-magnetic layer, and a magnetic DC-field-generation (DFG) layer. In some embodiments, the magnetic notch is adjacent to the main pole, the non-magnetic spacer is adjacent to the magnetic notch, the non-magnetic layer is adjacent to the trailing shield, and the DFG layer is sandwiched between the non-magnetic layer and the non-magnetic spacer. In some embodiments, the magnetic notch is adjacent to the trailing shield, the non-magnetic spacer is adjacent to the magnetic notch, the non-magnetic layer is adjacent to the main pole, and the DFG layer is sandwiched between the non-magnetic layer and the non-magnetic spacer.

In some embodiments, a thickness of the magnetic notch is between approximately 1 nm and approximately 10 nm.

In some embodiments, a width of the magnetic notch is substantially identical to a width of the DFG layer, and a height of the magnetic notch is substantially identical to a height of the DFG layer.

In some embodiments, at least one of a width of the magnetic notch or a height of the magnetic notch is less than about 50 nm.

In some embodiments, the magnetic notch comprises a multi-layer structure.

In some embodiments, the magnetic notch comprises at least one of iron or cobalt. In some embodiments, the magnetic notch comprises $Fe_{70}Co_{30}$.

In some embodiments, the magnetic notch comprises iron-cobalt. In some embodiments in which the magnetic notch comprises iron-cobalt, a thickness of the magnetic notch is between approximately 1 nm and approximately 10 nm.

In some embodiments, at least one aspect of the magnetic notch is selected such that, in operation, the magnetic notch provides spin-torque to align a DC component of a magnetization of the DFG layer in a direction that is substantially opposite to a gap field direction. In some embodiments, the at least one aspect comprises at least one of a structure, a polarization, a spin diffusion length, a Ms value, a Hk value, a damping, a material, a composition, a resistivity, a thickness, or a dimension. In some embodiments, the at least one aspect comprises the polarization and the spin diffusion length, and wherein the polarization exceeds a threshold polarization value and the spin diffusion length is less than a threshold spin diffusion length value. In some embodiments, the at least one aspect comprises the damping, and wherein the damping exceeds a threshold damping value. In some embodiments, the at least one aspect comprises the structure, and wherein the structure comprises at least two layers. In some embodiments, the at least one aspect comprises the resistivity, and wherein the resistivity is less than a threshold resistivity value.

In some embodiments, the main pole and the magnetic notch are made of identical materials. In some embodiments, the trailing shield and the magnetic notch are made of identical materials. In some embodiments in which the main pole and the magnetic notch, or the trailing shield and the magnetic notch, are made of identical materials, a thickness of the magnetic notch is between approximately 1 nm and approximately 10 nm.

In some embodiments, a data storage device comprises at least one recording media and a write head for writing to the at least one recording media. In some embodiments, the write head comprises a main pole, a trailing shield, a magnetic notch adjacent to either the trailing shield or the main pole, a non-magnetic spacer situated between the main pole and the trailing shield, a non-magnetic layer situated between the main pole and the trailing shield, and a magnetic DC-field-generation (DFG) layer adjacent to the non-magnetic spacer and situated between the non-magnetic spacer and the non-magnetic layer, wherein the magnetic DFG layer is the only magnetic layer between the main pole and the trailing shield that is not adjacent to the main pole or the trailing shield. In some embodiments, the data storage device also includes a first conducting line for providing a write current to the main pole, a second conducting line for providing a bias current to the magnetic DFG layer, and signal processing circuitry coupled to the first and second conducting lines and configured to control the write current and the bias current.

In some embodiments, the magnetic notch comprises a multi-layer structure.

In some embodiments, the magnetic notch comprises at least one of iron or cobalt. In some embodiments, the magnetic notch comprises iron-cobalt.

In some embodiments, a thickness of the magnetic notch is between approximately 1 nm and approximately 10 nm.

In some embodiments, the magnetic notch comprises $Fe_{70}Co_{30}$.

In some embodiments, the magnetic notch is a first magnetic notch adjacent to the trailing shield, and the data storage device further comprises a second magnetic notch adjacent to the main pole. In some embodiments having first and second magnetic notches, a thickness of the first or second magnetic notch is between approximately 1 nm and approximately 10 nm.

In some embodiments, a width of the magnetic notch is substantially identical to a width of the DFG layer, and a height of the magnetic notch is substantially identical to a height of the DFG layer.

In some embodiments, at least one of a width of the magnetic notch or a height of the magnetic notch is less than about 50 nm.

In some embodiments, at least one aspect of the magnetic notch is selected such that, in operation, the magnetic notch provides spin-torque to align a DC component of a magnetization of the DFG layer in a direction that is substantially opposite to a gap field direction. In some embodiments, the at least one aspect comprises at least one of a structure, a polarization, a spin diffusion length, a Ms value, a Hk value, a damping, a material, a composition, a resistivity, a thickness, or a dimension. In some embodiments, the at least one aspect comprises the polarization and the spin diffusion length, and wherein the polarization exceeds a threshold polarization value and the spin diffusion length is less than a threshold spin diffusion length value. In some embodiments, the at least one aspect comprises the damping, and wherein the damping exceeds a threshold damping value. In some embodiments, the at least one aspect comprises the resistivity, and wherein the resistivity is less than a threshold resistivity value.

In some embodiments, the magnetic notch comprises a multi-layer structure.

In some embodiments, the magnetic notch is adjacent to the trailing shield and is disposed between the trailing shield and the non-magnetic spacer. In some embodiments in which the magnetic notch is adjacent to the trailing shield, the trailing shield and the magnetic notch are made of identical materials. In some embodiments, a thickness of the magnetic notch is between approximately 1 nm and approximately 10 nm.

In some embodiments, the magnetic notch is adjacent to the main pole and is disposed between the main pole and the non-magnetic spacer. In some embodiments in which the magnetic notch is adjacent to the main pole, the main pole and the magnetic notch are made of identical materials. In some embodiments, a thickness of the magnetic notch is between approximately 1 nm and approximately 10 nm.

In some embodiments, a thickness of an effective write gap of the write head, the effective write gap including the non-magnetic spacer, the non-magnetic layer, the magnetic notch, and the magnetic DFG layer, is between approximately 15 nm and approximately 25 nm.

In some embodiments, a thickness of the non-magnetic spacer is between about 3 nm and about 5 nm, a thickness of the magnetic DFG layer is between about 3 nm and about 9 nm, a thickness of the magnetic notch is between about 1 nm and about 10 nm, and a thickness of the non-magnetic layer is between about 8 nm and about 19 nm.

In some embodiments, at least one of the non-magnetic spacer, the magnetic DFG layer, or the magnetic notch comprises a multi-layer structure.

BRIEF DESCRIPTION OF THE DRAWINGS

The disclosure herein is illustrated by way of example, and not by way of limitation, in the figures of the accompanying drawings, in which like reference numerals refer to similar elements and in which:

FIG. 2B illustrates the portion of the prior-art write head when the STO is on.

DETAILED DESCRIPTION

The following description is made for the purpose of illustrating the general principles of the present disclosure and is not meant to limit the inventive concepts claimed herein. Furthermore, particular embodiments described herein may be used in combination with other described embodiments in various possible combinations and permutations.

Disclosed herein are embodiments of a data storage device having a write transducer with spin-torque-assisted write field enhancement. The disclosed write transducers (also referred to herein as write heads or writers) include a DC-field-generation (DFG) layer. Unlike a write transducer that includes a STO in the write gap, the disclosed write transducers provide improvements without requiring resonance with the magnetic layers in the write transducer. Specifically, the DFG layer arranges its magnetic moment so that its DC component assists the write field. The frequency of the field generated by the DFG layer is large enough that the magnetic media does not respond, and therefore the DFG layer does not contribute to the write field in an AC sense, yet the DC component generated by the DFG layer provides a substantial gain in write field and gradient for a narrow write transducer. Moreover, the DFG layer is thinner than a conventional STO and may be more easily included in high-gradient narrow write gaps. In addition, the disclosed write transducers may be easier to fabricate and may have a more predictable performance than write transducers that include a STO.

Figure 1A:
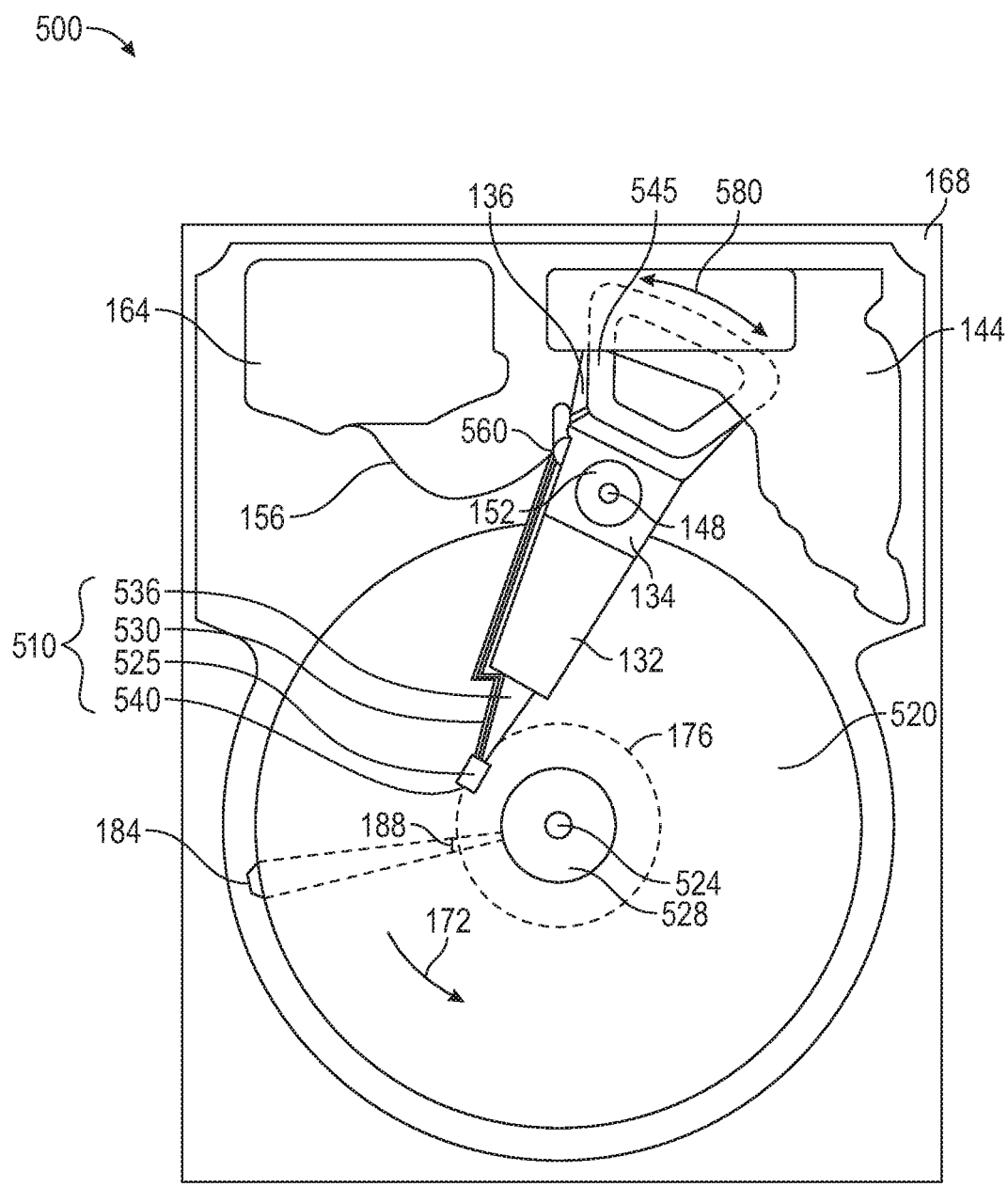
FIG. 1A illustrates several components of an exemplary hard disk drive in accordance with some embodiments.

An explanation of the components and operation of a data storage device, exemplified by a hard disk drive, sets the stage for a detailed explanation of the write transducer with spin-torque-assisted write field enhancement. FIG. 1A is a plan view illustrating an example of a data storage device, namely a hard disk drive (HDD) 500, which may include one or more of the embodiments disclosed herein. FIG. 1A illustrates an example of the functional arrangement of components of the HDD 500, including a slider 525 that includes a magnetic recording head 540. The head 540 includes a write element and a read element for respectively writing and reading information stored on a media 120 of the HDD 500. The HDD 500 includes at least one head gimbal assembly (HGA) 510, which includes the slider 525, a suspension 530 attached to the slider 525, and a load beam 536 attached to the suspension 530. The HDD 500 also includes at least one magnetic-recording media 520 rotatably mounted on a spindle 524 and a drive motor (not shown) attached to the spindle 524 for rotating the media 520. The media 520, which may include a plurality of disks, may be affixed to the spindle 524 by a disk clamp 528.

The HDD 500 further includes an arm 132 attached to the HGA 510, a carriage 134, a voice-coil motor (VCM) that includes an armature 136 including a voice coil 545 attached to the carriage 134, and a stator 144 including a voice-coil magnet. The armature 136 of the VCM is attached to the carriage 134 and is configured to move the arm 132 and the HGA 510 to access portions of the media 520. The carriage 134 is mounted on a pivot-shaft 148 with an interposed pivot-bearing assembly 152. In the case of a HDD having multiple disks (also sometimes referred to as "platters"), the carriage 134 may be called an "E-block," or comb, because the carriage 134 is arranged to carry a ganged array of arms 132 that gives it the appearance of a comb.

An assembly comprising a head gimbal assembly (e.g., HGA 510), including a suspension flexure to which the slider 525 is coupled, an actuator arm (e.g., arm 132) to which the suspension is coupled, and an actuator (e.g., the VCM) to which the actuator arm is coupled, may be collectively referred to as a head stack assembly (HSA). The HSA also includes a suspension tail. Generally, a HSA is the assembly configured to move the slider 525 to enable the head 540 to access portions of the media 520 (e.g., magnetic-recording disks) for read and write operations.

In accordance with some embodiments, electrical signals (for example, current to the voice coil 545 of the VCM, write signals to and read signals from the head 540, etc.) are provided by a flexible interconnect cable 156 ("flex cable"). Interconnection between the flex cable 156 and the head 540 may be provided by an arm-electronics (AE) module 560, which may have an on-board pre-amplifier for the read signal, as well as other read-channel and write-channel electronic components. The AE 560 may be attached to the carriage 134 as shown. The flex cable 156 is coupled to an electrical-connector block 164, which provides electrical communication through electrical feed-throughs provided by a HDD housing 168. The HDD housing 168, in conjunction with a HDD cover (not shown), provides a sealed, protective enclosure for the information storage components of the HDD 500.

In accordance with some embodiments, other electronic components, including a disk controller and servo electronics such as a digital-signal processor (DSP), provide electrical signals to the drive motor, the voice coil 545 of the VCM, and the head 540 of the HGA 510. The electrical signal provided to the drive motor enables the drive motor to spin, thereby providing a torque to the spindle 124, which is in turn transmitted to the media 520 that is affixed to the spindle 124 by the disk clamp 528; as a result, the media 520 spins in a direction 172. The spinning media 120 creates a cushion of air that acts as an air-bearing on which the air-bearing surface (ABS) of the slider 525 rides so that the slider 525 flies above the surface of the media 520 without making contact with a thin magnetic-recording medium of the media 520 in which information is recorded.

The electrical signal provided to the voice coil 545 of the VCM enables the head 540 of the HGA 510 to access a track 176 on which information is recorded. Thus, the armature 136 of the VCM swings through an arc 580, which enables the HGA 510 attached to the armature 136 by the arm 132 to access various tracks on the media 520. Information is stored on the media 520 in a plurality of sectored tracks arranged in sectors on the media 520, for example, sector 184. Correspondingly, each track is composed of a plurality of sectored track portions, for example, sectored track portion 188. Each sectored track portion 188 includes recorded data and a header containing a servo-burst-signal pattern, for example, an ABCD-servo-burst-signal pattern, information that identifies the track 176, and error correction code information. In accessing the track 176, the read element of the head 540 of the HGA 510 reads the servo-burst-signal pattern, which provides a position-error-signal (PES) to the servo electronics, which controls the electrical signal provided to the voice coil 545 of the VCM, enabling the head 540 to follow the track 176. Upon finding the track 176 and identifying a particular sectored track portion 188, the head 540 either reads data from the track 176 or writes data to the track 176, depending on instructions received by the disk controller from an external agent, for example, a microprocessor of a computer system to which the HDD 500 is connected.

For reading the information stored on the media 520, the head 540 may include only one read sensor, or it may include multiple read sensors. The read sensor(s) in the head 540 may include, for example, one or more giant magnetoresistance (GMR) sensors, tunneling magnetoresistance (TMR) sensors, or another type of magnetoresistive sensor. When the slider 525 passes over a track 176 on the media 520, the head 540 detects changes in resistance due to magnetic field variations recorded on the media 520, which represent the recorded bits.

A slider 525 is mounted on a gimbal portion of the suspension located near a distal end of the flexure. The slider 525 includes a magnetic head for reading and/or writing data to the media (e.g., the magnetic disk or platter).

In some embodiments, the slider 525 and/or head 540 also include additional elements or components that may improve read/write performance and/or areal density capacity. For example, the need to increase storage densities has led to the development of technologies such as microwave-assisted magnetic recording (MAMR). In MAMR systems, a spin-torque oscillator (STO) is placed within the write gap of the head 540, and a bias current is supplied to the STO. In operation, the head 540 generates a write field that, beneath the main pole, is substantially perpendicular to the magnetic recording layer of the media 520, and the STO generates a high-frequency auxiliary field to the recording layer. Ideally, the auxiliary field has a frequency close to the resonance frequency of the magnetic grains in the recording layer to facilitate the switching of the magnetization of the grains. As a consequence, the oscillating field of the STO resonates the magnetic recording components (e.g., head or media), which aids with magnetic precession for the material's magnetic orientation switching efficiency. In addition, the STO's auxiliary field may also be used for write field enhancement with the STO mounted near the pole tip of the head 540. To generate the auxiliary write field, the STO requires the application of a bias voltage (or current) that affects the write transducer's pole potential. Prior art systems used DC voltages (or currents) to bias the STO, but more recently-developed systems use STO bias voltages (or currents) that have AC components.

In accordance with some embodiments disclosed herein, the slider 525 and/or head 540 of FIG. 1A includes a magnetic DC-field-generation (DFG) layer, described in more detail below.

The flexure comprises conductors, described further below, which carry currents used for writing or reading to a magnetic medium (e.g., the magnetic disk 520). They may also carry currents used to provide power to and/or control other elements residing on the slider (e.g., STO, DFG layer, etc.). Thus, first ends of the conductors are connected to elements on the slider (e.g., the magnetic head, STO, DFG layer, etc.), and the other ends of the conductors are connected to tail electrodes formed in the flexure tail. These tail electrodes are electrically connected to terminals of a circuit board, such as a printed circuit board (PCB). The PCB includes a signal processing circuit, such as a preamplifier.

Figure 1B:
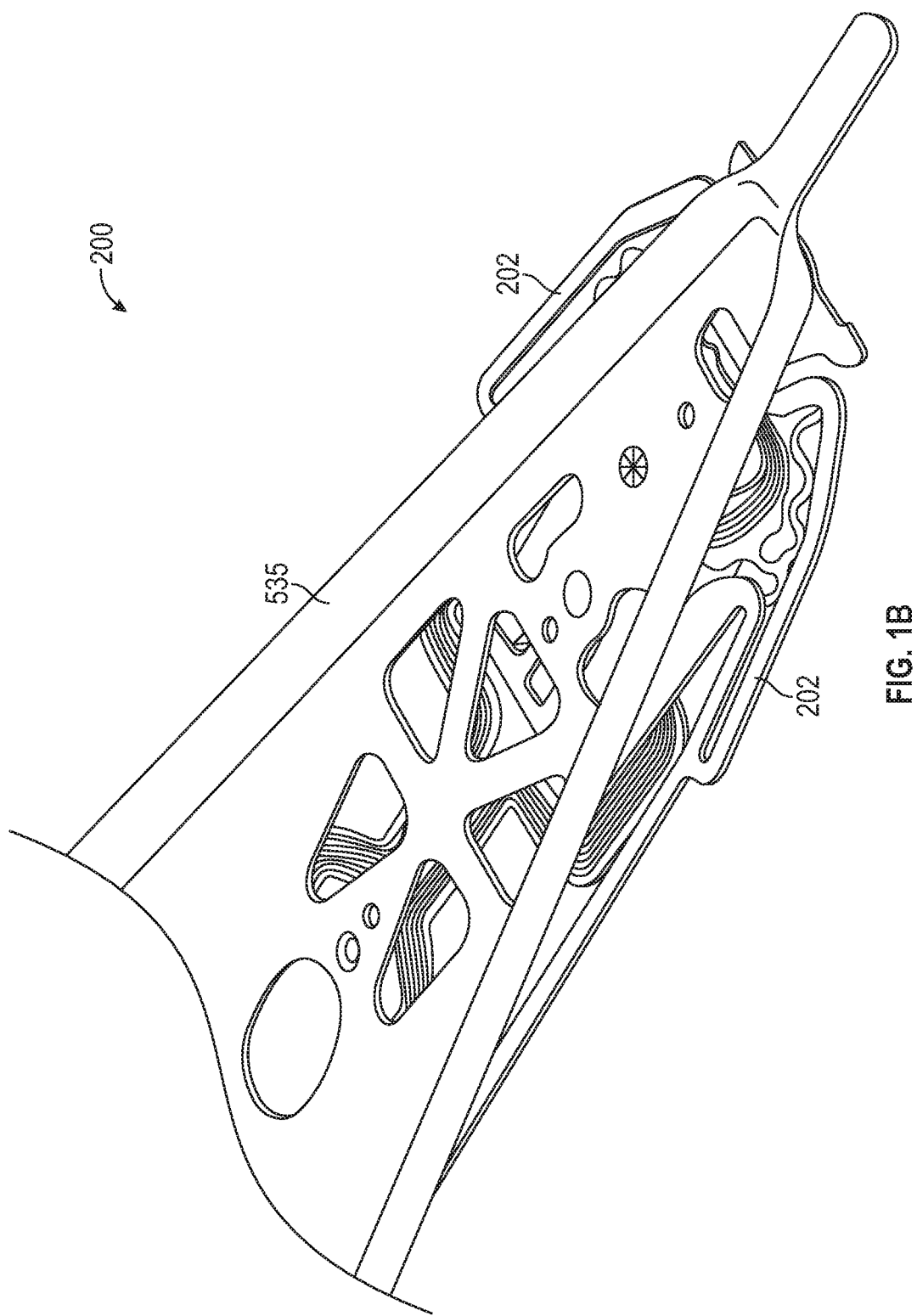
FIG. 1B is a perspective view illustrating a head gimbal assembly that may be used in conjunction with some embodiments.

FIG. 1B is a perspective view illustrating a HGA 200 that may be used in conjunction with some embodiments. The HGA 200 comprises a flexure 202 and a load beam 535. The flexure 202 provides gimbaled support for the slider 525 so that the head 540 can pitch and roll in order to adjust its orientation. The flexure 202 may be made out of a laminated multilayer material. In some embodiments, the flexure 202 comprises multiple assembled layers, including (1) a support layer made of, for example, steel; (2) an insulator (or "insulating") layer, which may be, for example, polyimide; (3) a conductor layer; and (4) a cover layer (e.g., polyimide) that insulates the conductor layer. Electrical lead lines, also referred to herein as conducting lines, conductors, or traces, are etched into the conductor layer, while the insulator layer insulates the lead lines from the underlying support layer. The support layer may be patterned to provide strength and gimbaling characteristics to the flexure 202. The conducting lines electrically connect the elements on the slider 525 (e.g., the head 540 and any additional elements on the slider 525, such as, for example, an STO, ECS, or TFC) to the read/write electronics (e.g., AE module 560) and are often routed on both sides of the suspension, especially in the gimbal region. The conducting lines may be made of copper conductor for providing electrical function.

Figure 1C:
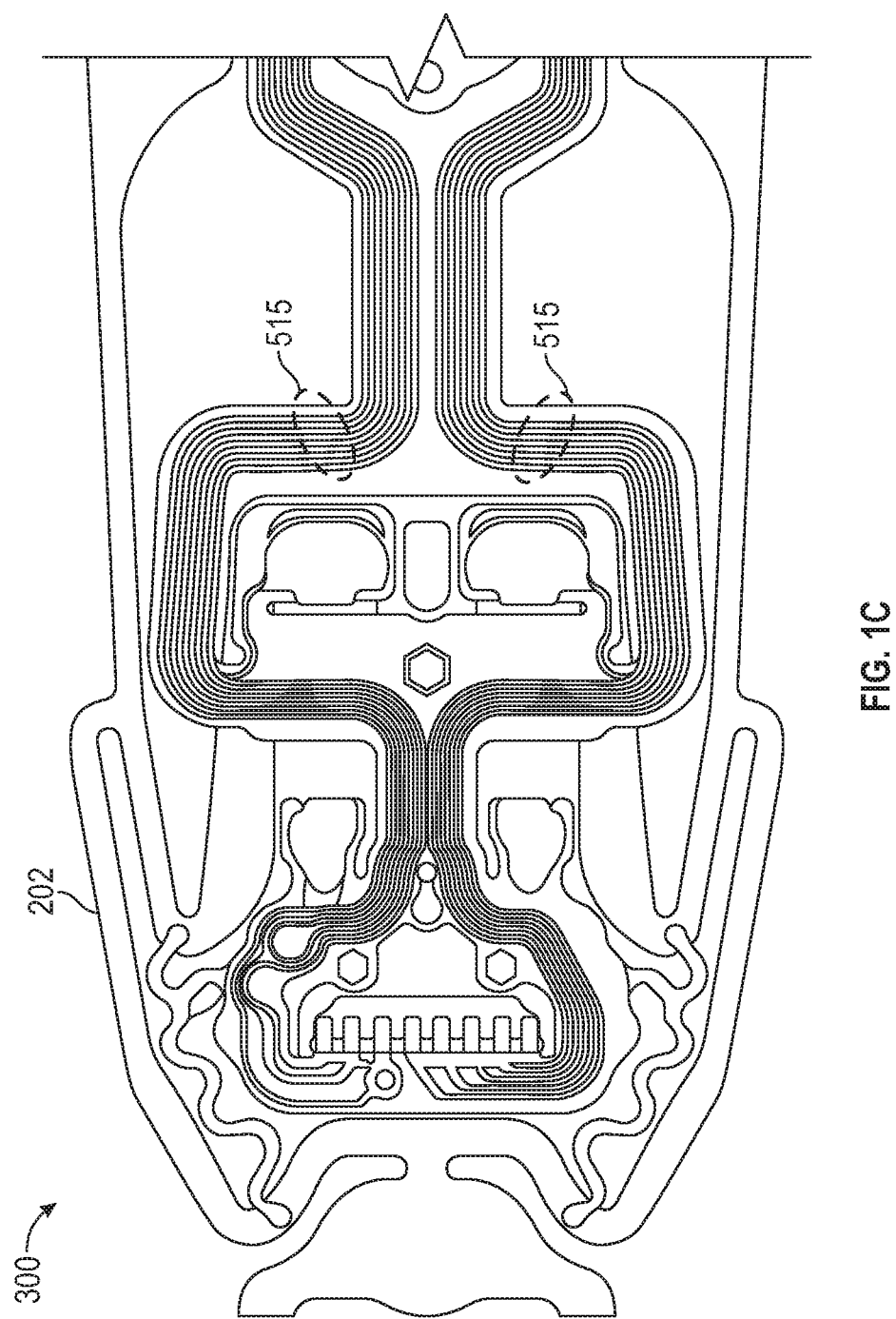
FIG. 1C is a bottom plan view illustrating a flexure gimbal assembly.

FIG. 1C is a bottom plan view illustrating a flexure gimbal assembly 300. FIG. 1C illustrates the assembly with the slider 525 omitted. The conducting lines 515 extend along the flexure gimbal assembly 300 and supply, for example, write current to the head 540. In accordance with some embodiments, the conducting lines 515 also supply a bias current to the DFG layer, as discussed in further detail below.

Figure 2A:
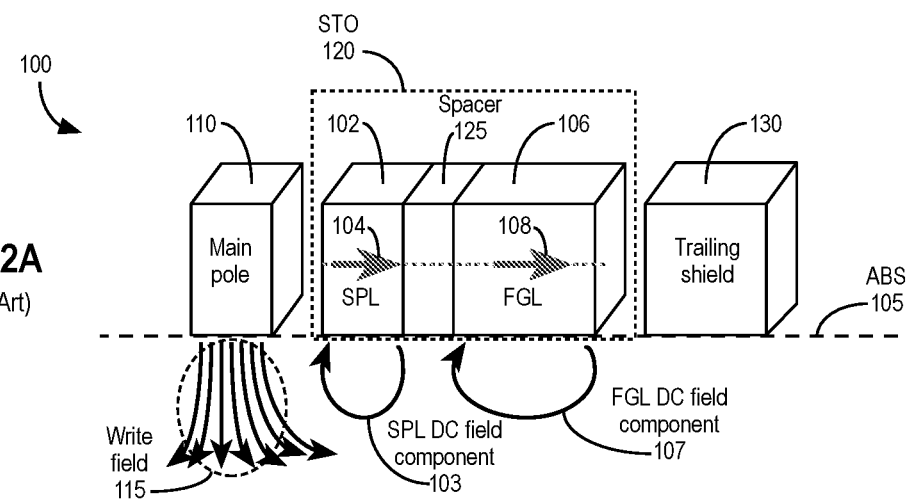
FIG. 2A illustrates a portion of a prior-art write head that includes a STO disposed between a main pole and a trailing shield. The STO is off, meaning that no bias current is applied.

FIG. 2A is a simplified illustration of a portion of a prior-art write head 100 that includes a STO 120 disposed between a main pole 110 and a trailing shield 130. The STO 120 includes a SPL 102, a spacer 125, and a FGL 106. As shown in FIG. 2A, a write field 115 emanates substantially perpendicular to the ABS 105 from the main pole 110. In FIG. 2A, the STO 120 is off, meaning that no bias current is applied. When the STO 120 is off, the magnetizations 104 and 108 of both the SPL 102 and the FGL 106, shown in FIG. 2A as arrows within the boxes representing the SPL 102 and the FGL 106, align with writer's gap field, thus producing a "negative DC effect." The effect is negative because, in the media, these fields oppose the writer field, making it weaker; the effect is "DC" because there is no magnetic oscillation to produce AC fields. Thus, even when the STO is off, the SPL 102 generates, in the magnetic media, a DC field component 103 that opposes the write field 115. Likewise, even when the STO is off, the FGL 106 generates, in the magnetic media, a DC field component 107 that also opposes the write field 115. Consequently, when the STO 120 is off, it decreases the write field 115 in the magnetic media, which indicates that the STO configuration imposes a handicap that must be overcome before the STO structure provides any benefit.

Figure 2B:
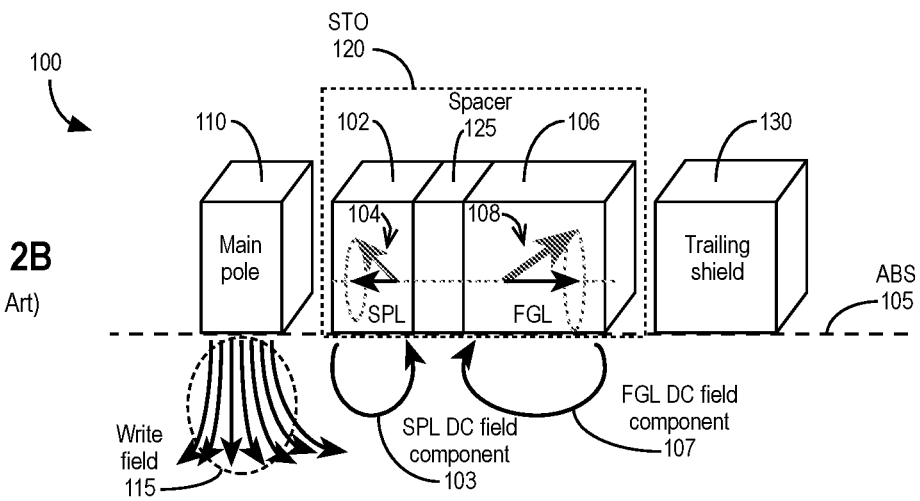

FIG. 2B illustrates the portion of the prior-art write head 100 when the STO 120 is on, meaning that sufficient bias current is applied. When the STO 120 is on, the magnetizations 104 and 108 of both the SPL 102 and the FGL 106 oscillate, with the frequency of the FGL magnetization 108 typically being much smaller than the frequency of the SPL magnetization 104. As shown in FIG. 2B, the FGL magnetization 108 precesses, which generates an elliptically polarized AC field that, ideally, resonates with the media. In addition, the down-track component of the FGL magnetization 108 is approximately constant, which causes a negative DC field component 107 that is weaker than when the STO 120 is off. The SPL magnetization 104 also precesses, but the frequency of the resulting AC field is too high to induce media resonance. The frequency of the SPL magnetization 104 is typically so much larger than the effective resonant frequency of the media that the media cannot respond to it. Consequently, the contribution of the SPL magnetization 104 is primarily DC. As the magnetizations 104 and 108 of the SPL 102 and the FGL 106 oscillate, the FGL magnetization 108 has a DC component that is aligned with the writer's gap field (not shown in FIG. 2B). As when the STO 120 is off, the FGL magnetization 108 causes a negative FGL DC field component 107 that reduces the write field 115 in the media. The DC component of the SPL magnetization 104, on the other hand, is aligned opposite to the gap field, causing a SPL DC field component 103 that is a "positive DC effect," which enhances the write field 115 in the media. Thus, the DC field components 103 and 107 of the SPL and FGL, respectively, compete against one another within the media layer.

Figure 3:
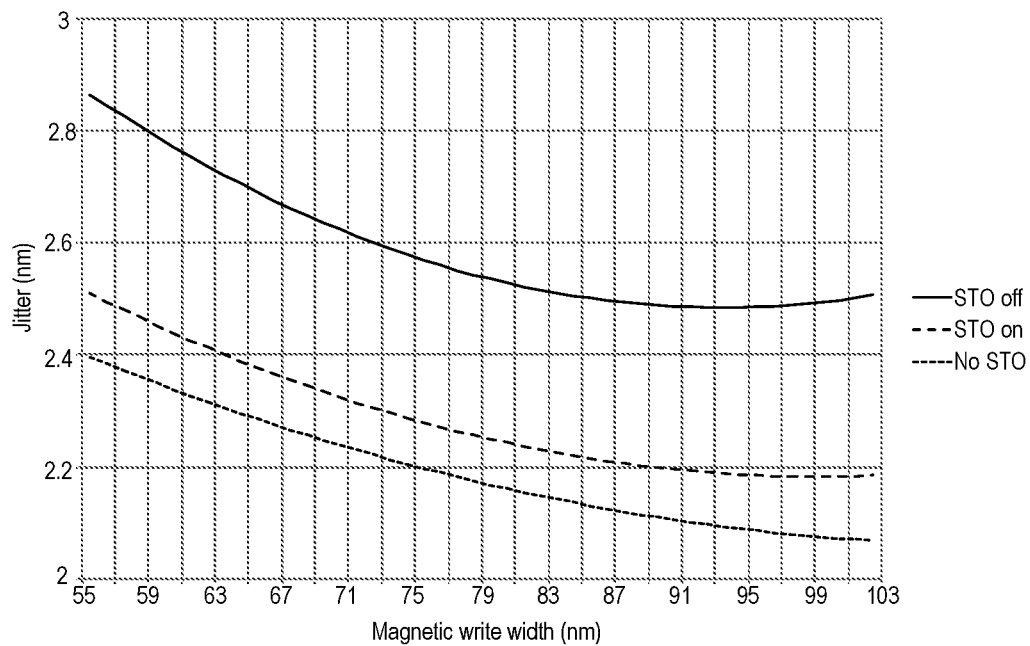
FIG. 3 illustrates three curves fit to spin-stand data to compare the performance of three write heads.

FIG. 3 illustrates three curves fit to spin-stand data to compare the jitter performance of three write heads. Jitter is a measure of the fluctuation of the media's recorded bit transition locations relative to their ideal noiseless positions. It is desirable to minimize jitter. The solid curve shown in FIG. 3 illustrates the jitter, in nm, as a function of magnetic write width, in nm, for a write head "A" that includes an STO 120 with no bias current applied (i.e., the STO 120 is situated in the write gap, but it is off). The long-dash curve illustrates the jitter as a function of magnetic write width for the same write head A with the STO 120 on (i.e., with an adequate bias current applied). The short-dash curve illustrates the jitter as a function of magnetic write width for a conventional write head "B" without an STO 120; note that the design of write head B is equivalent to replacing the STO of write head A with non-magnetic material. FIG. 3 indicates that the write head A with the STO 120 on provides lower jitter (and, therefore, better performance) than the write head A with the STO 120 off, but it does not perform as well as the write head B without any STO 120 at all. Thus, FIG. 3 illustrates the competition of the SPL and FGL DC field components 103 and 107 discussed in the context of FIG. 2B.

Figure 4:
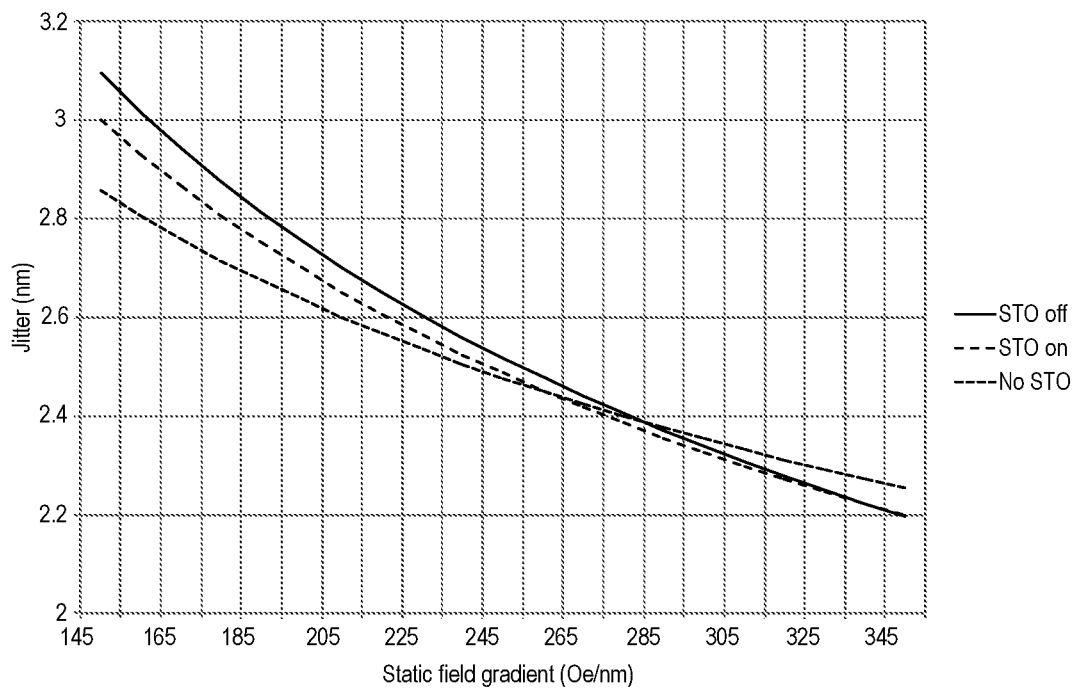
FIG. 4 plots the spin-stand data versus the modeled DC field gradient from two write heads, one having an STO, and the other having no STO.

FIG. 4 plots the spin-stand jitter versus the modeled DC field gradient from the write heads A and B described in the context of FIG. 3. FIG. 4 illustrates that the jitter performances of the write head A with the STO 120 on, the write head A with the STO 120 off, and the write head B without any STO 120 follow approximately the same curve with respect to the static field gradient. This result suggests that there is very little AC effect from the FGL 106, because DC modeling can roughly account for the observations. The inventors believe, based on STO characterization and modeling, that the FGL magnetization 108 oscillates too slowly to provide a significant AC effect. Based on this observation, and because, as shown in FIG. 3, the write head A with the STO 120 on performs almost as well as the write head B with no STO 120, the positive SPL DC component 103 has almost as much impact as the negative FGL DC component 107.

Based on these observations, the inventors conceived spin-torque-assisted write field enhancement using a DC-field-generating (DFG) layer in the write gap. The DFG layer produces a DC component that adds constructively to the write field 115 and thereby provides a larger field gradient and a larger write field magnitude, which results in smaller transition jitter and a larger low-frequency signal-to-noise ratio. Although a MAMR writer with a STO could produce a similar DC effect if the spin-torque were strong enough to orient the FGL magnetization 108 so that a significant FGL DC component 107 were aligned opposite the gap field, fabricating such a MAMR writer is difficult because it demands a SPL 102 with very high anisotropy (to prevent SPL precession) and polarization (to provide sufficient spin-torque). There are currently no good material candidates for such a device.

Figure 5A:
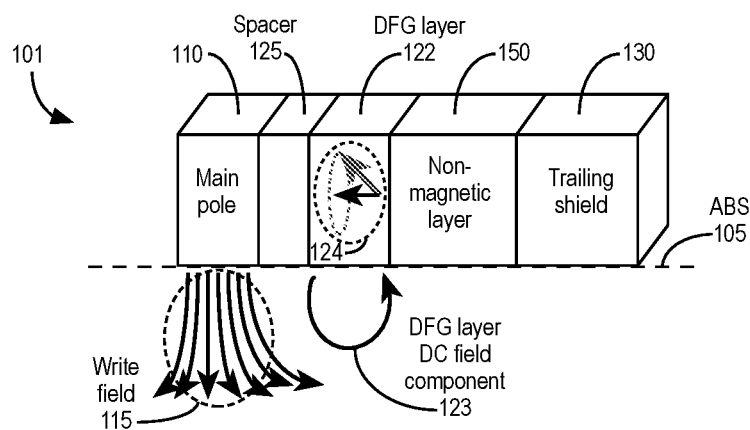
FIG. 5A illustrates a portion of a writer with spin-torque-assisted write field enhancement in accordance with some embodiments, referred to herein as "main-pole (MP) integrated" embodiments.

FIG. 5A is a simplified illustration of a portion of a writer 101 (also referred to herein as a write head) in accordance with some embodiments that are referred to herein as "main-pole-integrated" or "MP-integrated" embodiments. As shown in FIG. 5A, a write field 115 emanates substantially perpendicular to the ABS 105 from the main pole 110. A DFG layer 122, which is magnetic, is included in the write gap between the main pole 110 and the trailing shield 130. A structure between the main pole 110 and the trailing shield 130 that includes a DFG layer 122, however many other layers or components it includes and whatever their properties may be, is referred to generally herein as a write-field enhancement structure. In the exemplary embodiment of FIG. 5A, a spacer 125, which is non-magnetic, is adjacent to the main pole 110, which is the spin source for the DFG layer 122, and the DFG layer 122 is adjacent to the spacer 125. In some embodiments, a magnetic notch (not shown in FIG. 5A but shown in FIG. 5B and described in detail below) may be interposed between the main pole 110 and the spacer 125. A non-magnetic layer 150 is adjacent to the DFG layer 122 and the trailing shield 130. In the illustrated embodiment, the DFG layer 122 is sandwiched between the spacer 125 and the non-magnetic layer 150. FIG. 5A illustrates the DFG layer magnetization 124, which results in the DFG layer DC field component 123 generated in the media when a sufficient bias current is applied to the writer 101. The DFG layer DC field component 123 is in the same direction as the write field 115 in the media and therefore adds constructively to the write field 115. Note that the frequency at which the AC component of the DFG layer magnetization 124 oscillates is substantially higher than the effective resonant frequency of the media, and therefore the media cannot respond to it. Consequently, the contribution of the DFG layer magnetization 124 is primarily DC.

Figure 5B:
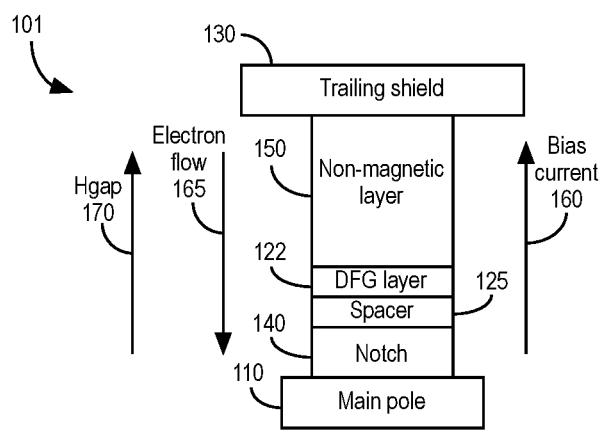
FIG. 5B is a view of the air-bearing surface (ABS) of the writer shown in FIG. 5A with a magnetic notch added between the spacer and the main pole in accordance with some embodiments.

FIG. 5B is a view of the ABS 105 of the writer 101 shown in FIG. 5A with a write-field enhancement structure that includes the magnetic notch 140 added between the spacer 125 and the main pole 110 in accordance with some embodiments. The purpose of the magnetic notch 140 is twofold. First, the magnetic notch 140 provides the spin-torque necessary to align the DC component of the DFG layer magnetization 124 opposite to Hgap 170 without undesired loss of spin current arising from potential interfacial imperfections and discontinuities due to depositing the spacer 125 directly on the main pole 110. Second, the magnetic notch 140 improves crystalline growth of the spacer 125 and the DFG layer 122 by acting as a seed layer deposited on the surface of the main pole 110, while keeping a suitable separation between the main pole 110 and trailing shield 130. As illustrated in FIG. 5B, the bias current 160 flows in the direction from the main pole 110 to the trailing shield 130; by the definition of current, the electron flow 165 is in the opposite direction. Note that the direction of Hgap 170 will reverse if the write coil's excitation changes polarity (e.g., if the writer 101 is writing an "up" bit instead of a "down" bit, or vice versa), with the magnetic orientation of the DFG layer 122 being opposite as well, such that the DC component of the DFG layer magnetization 124 still opposes Hgap 170.

In some embodiments, at least one aspect of the magnetic notch 140 (e.g., a structure (e.g., single layer v. multi-layer), polarization, spin diffusion length, Ms value, Hk value, damping, material, composition, resistivity, thickness, dimension, etc.) is selected such that, when the writer 101 is in operation, the magnetic notch 140 provides spin-torque to align the DC component of the magnetization of the DFG layer 122 in a direction substantially opposite to the direction of the gap field (Hgap 170). In some embodiments, the at least one aspect comprises the polarization and spin diffusion length, and the polarization is selected to exceed a threshold polarization value when the writer 101 is in operation, and the spin diffusion length is selected to be less than a threshold spin diffusion length value when the writer 101 is in operation. In some embodiments, the at least one aspect comprises the damping, which is selected to exceed a threshold damping value when the writer 101 is in operation. In some embodiments, the at least one aspect comprises the resistivity, which is selected so that when the writer 101 is in operation, the resistivity is less than a threshold resistivity value.

In MP-integrated embodiments, the magnetic notch 140 may be made of the same material as the main pole 110. For example, both the main pole 110 and the magnetic notch 140 may comprise iron-cobalt. In some embodiments, the magnetic notch 140 comprises at least one of cobalt or iron. The magnetic notch 140 may be a single layer, or it may include multiple layers (e.g., a multi-layer structure having at least two layers). In some embodiments, the thickness of the magnetic notch 140 is between about 1 nm and about 10 nm. FIGS. 8A through 8J, discussed below, provide examples of MP-integrated embodiments that include the magnetic notch 140.

The magnetic notch 140 may have dimensions that are similar or identical to the dimensions of the DFG layer 122. For example, the width (in the cross-track direction, perpendicular to the downtrack direction) and/or height (extending away from the ABS 105 shown in FIG. 5A) of the magnetic notch 140 may be substantially identical to, respectively, the width and height of the DFG layer 122. The width and height may be any suitable values. In some embodiments, the width and/or height of the magnetic notch 140 is less than or equal to about 50 nm.

It is to be understood that although FIG. 5B, and other figures herein (e.g., FIGS. 6B, 8A-8J, 9A-9F), illustrate only one magnetic notch 140, embodiments may include more than one magnetic notch 140. For example, an embodiment may include a first magnetic notch 140 adjacent to the main pole 110 and a second magnetic notch 140 adjacent to the trailing shield 130.

Figure 6A:
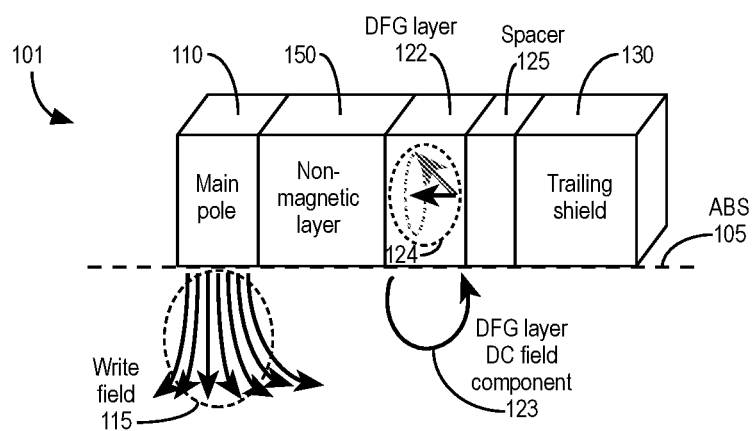
FIG. 6A illustrates a portion of a writer with spin-torque-assisted write field enhancement in accordance with other embodiments, referred to herein as "trailing-shield (TS) integrated" embodiments.

FIG. 6A is a simplified illustration of a portion of a writer 101 in accordance with other embodiments, referred to herein as "trailing shield (TS) integrated" embodiments. The components of the write-field enhancement structure shown in FIG. 6A were described above in the context of FIG. 5A. Those descriptions also apply to FIG. 6A and are not repeated here. As shown in FIG. 6A, a write field 115 emanates substantially perpendicular to the ABS 105 from the main pole 110. In this case, however, the non-magnetic layer 150 is disposed between the main pole 110 and the DFG layer 122. The spacer 125 is adjacent to the DFG layer 122 and disposed between the DFG layer 122 and the trailing shield 130. As in the exemplary MP-integrated embodiment shown in FIGS. 5A and 5B, an optional notch (not shown in FIG. 6A but illustrated in FIG. 6B and discussed in detail below) may be included between the spacer 125 and the trailing shield 130 in TS-integrated embodiments. In the TS-integrated embodiment of FIG. 6A, the trailing shield 130 is the spin source for the DFG layer 122. FIG. 6A illustrates the DFG layer magnetization 124, which results in the DFG layer DC field component 123 generated in the media when a sufficient bias current is applied to the writer 101. Within the media, the DFG layer DC field component 123 is in the same direction as the write field 115 and therefore adds constructively to the write field 115. As in the MP-integrated embodiments, the frequency at which the AC component of the DFG layer magnetization 124 oscillates is substantially higher than the effective resonant frequency of the media, and the contribution of the DFG layer magnetization 124 is primarily DC.

Figure 6B:
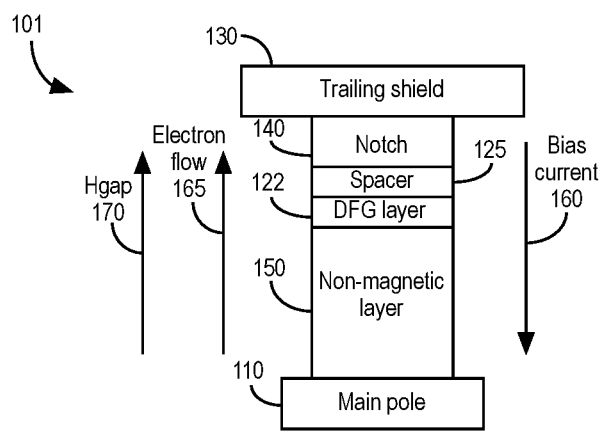
FIG. 6B is a view of the ABS of the writer shown in FIG. 6A with a magnetic notch added between the spacer and the trailing shield in accordance with some embodiments.

FIG. 6B is a view of the ABS 105 of the writer 101 shown in FIG. 6A with a magnetic notch 140 added between the spacer 125 and the trailing shield 130 in accordance with some embodiments of the write-field enhancement structure. The purpose of the magnetic notch 140 is as stated previously, namely to provide the spin-torque necessary to align the DFG layer DC magnetization component opposite to Hgap 170 without undesired loss of spin current, and to improve crystalline growth of the spacer 125 and the DFG layer 122. As explained above in the context of MP-integrated embodiments, in some TS-integrated embodiments, at least one aspect of the magnetic notch 140 (e.g., a structure (e.g., single layer v. multi-layer), polarization, spin diffusion length, Ms value, Hk value, damping, material, composition, resistivity, thickness, dimension, etc.) is selected such that, when the writer 101 is in operation, the magnetic notch 140 provides spin-torque to align the DC component of the magnetization of the DFG layer 122 in a direction substantially opposite to the direction of the gap field (Hgap 170). In some embodiments, the at least one aspect comprises the polarization and spin diffusion length, and the polarization is selected to exceed a threshold polarization value when the writer 101 is in operation, and the spin diffusion length is selected to be less than a threshold spin diffusion length value when the writer 101 is in operation. In some embodiments, the at least one aspect comprises the damping, which is selected to exceed a threshold damping value when the writer 101 is in operation. In some embodiments, the at least one aspect comprises the resistivity, which is selected so that when the writer 101 is in operation, the resistivity is less than a threshold resistivity value.

As illustrated in FIG. 6B, the bias current 160 flows in the direction from the trailing shield 130 to the main pole 110; thus, as explained previously, the electron flow 165 is in the opposite direction. As explained above, the direction of Hgap 170 will be opposite if the write coil's excitation changes polarity, with the magnetic orientation of the DFG layer 122 being opposite as well, such that the DC magnetization component still opposes Hgap 170. As explained above, MP-integrated and TS-integrated embodiments may include, for example, a first magnetic notch 140 adjacent to the main pole 110 and a second magnetic notch 140 adjacent to the trailing shield 130.

As explained above in the context of FIG. 5B, the magnetic notch 140 may have dimensions that are similar or identical to the dimensions of the DFG layer 122. For example, the width (in the cross-track direction, perpendicular to the downtrack direction) and/or height (extending away from the ABS 105 shown in FIG. 6A) of the magnetic notch 140 may be substantially identical to, respectively, the width and height of the DFG layer 122. The width and height may be any suitable values. In some embodiments, the width and/or height of the magnetic notch 140 is less than or equal to about 50 nm.

In TS-integrated embodiments, the magnetic notch 140 may be made of the same material as the trailing shield 130. For example, both the trailing shield 130 and the magnetic notch 140 may comprise iron-cobalt. In some embodiments, the magnetic notch 140 comprises at least one of cobalt or iron. The magnetic notch 140 may be a single layer, or it may include multiple layers (e.g., a multi-layer structure having at least two layers). In some embodiments, the thickness of the magnetic notch 140 is between about 1 nm and about 10 nm. FIGS. 9A through 9F, discussed below, provide examples of TS-integrated embodiments that include the magnetic notch 140.

Figure 7:
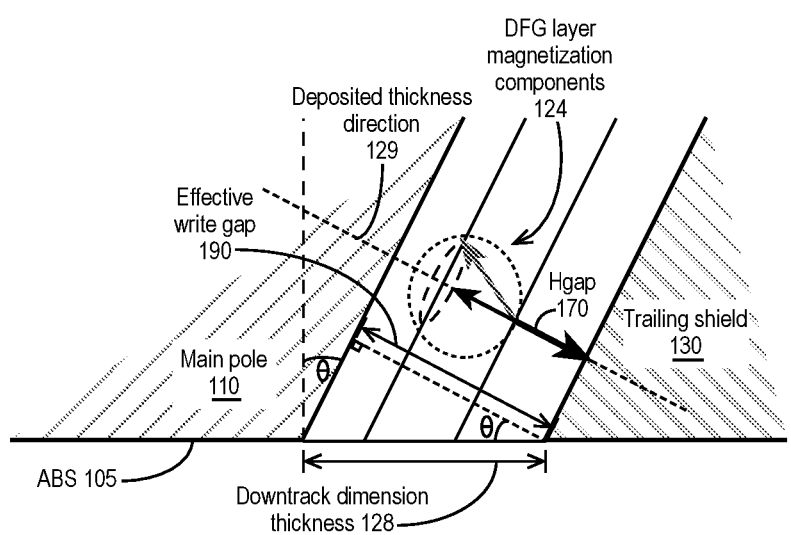
FIG. 7 illustrates certain dimensions of a write head having a trailing edge taper geometry in accordance with some embodiments.

In both MP-integrated embodiments and TS-integrated embodiments, the thickness of the effective write gap 190, which includes the spacer 125, the non-magnetic layer 150, and the DFG layer 122, may be between about 15 nm and about 25 nm. Preferably, the thickness of the effective write gap 190 is between about 20 nm and about 25 nm. Note that these measurements are perpendicular to the gap surfaces of the main pole 110 and trailing shield 130. As illustrated in FIG. 7, if the main pole 110 and trailing shield 130 gap surfaces are not perpendicular to the ABS, but instead are slanted or tapered at some angle θ, then the thickness of the effective write gap 190 along the ABS 105, labeled as the downtrack dimension thickness 128 in FIG. 7, is larger by a factor of 1/cos(θ) than the thickness of the effective write gap 190, which is in the deposited thickness direction 129. As an example, if the main pole 110 and trailing shield 130 are tapered at an angle of 25 degrees, the thickness of the effective write gap 190 along the ABS 105 (i.e., the downtrack dimension thickness 128) will be the thickness of the effective write gap 190 (i.e., the thickness in the deposited thickness direction 129) multiplied by a factor of 1/cos(25 degrees), or approximately 1.1. Note that, for simplicity, some of the drawings herein (e.g., FIGS. 5A and 6A) show the taper angle θ as zero, although the embodiments and claims are not so limited.

In both MP-integrated embodiments and TS-integrated embodiments, the spacer 125 may comprise, for example, copper, silver, gold, or an alloy of copper, silver, or gold. In some embodiments, the thickness of the spacer 125 is between about 3 nm and about 8-9 nm. The spacer 125 may have one layer, or it may have multiple layers (e.g., a multi-layer structure). For example, the spacer 125 may have a bilayer structure comprising a first layer of copper, silver, gold, or an alloy of copper, silver, or gold, and a second layer of chrome and/or ruthenium. A spacer 125 having such a bilayer structure may be used to reduce torque acting on notch. The spacer 125 operates as an exchange-breaking layer, maintaining good polarization at an interface adjacent to the main pole 110 or trailing shield 130 without substantially degrading spin-polarized current.

In both MP-integrated embodiments and TS-integrated embodiments, the non-magnetic layer 150 may comprise, for example, one or more of nickel, chromium, aluminum, ruthenium, tantalum, or copper. The non-magnetic layer 150 may comprise, for example, a nickel-aluminum alloy or a nickel-chromium alloy. In some embodiments, the thickness of the non-magnetic layer 150 is between about 8 nm and about 19 nm. The non-magnetic layer 150 may be only a single layer, or it may comprise multiple layers.

Figure 8A:
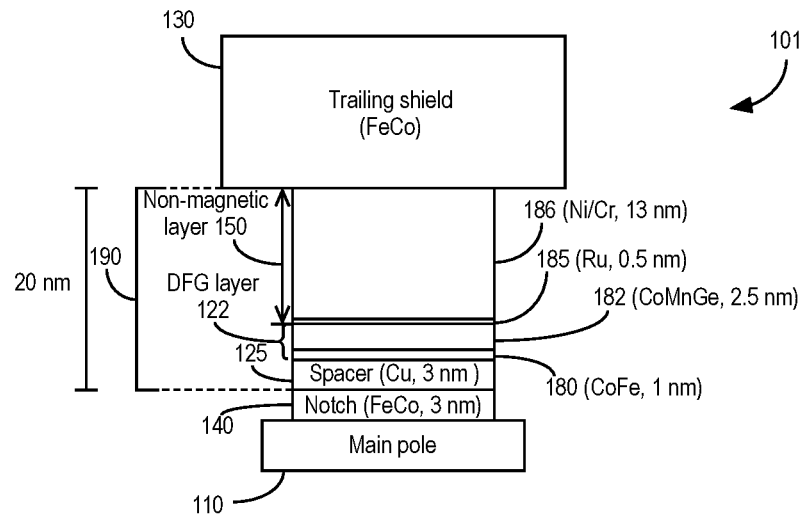
FIG. 8A is a view of the ABS of an exemplary MP-integrated writer in accordance with some embodiments.

In both MP-integrated embodiments and TS-integrated embodiments, the DFG layer 122 may be a single layer or may comprise multiple layers (e.g., a multi-layer structure). For example, in some embodiments, the DFG layer 122 comprises a first layer comprising at least one of cobalt, iron, or a cobalt-iron alloy, and a thicker second layer comprising a cobalt alloy denoted as CoXM, where X is, for example, manganese or iron, and M is, for example, germanium, aluminum, silicon, or gallium. In some such embodiments, the first layer is between about 0.2 nm and about 1 nm thick, and the second layer is between about 2 nm and about 8 nm thick. FIGS. 8A and 8D, discussed below, illustrate exemplary embodiments in which the DFG layer 122 comprises a first layer comprising CoFe and a second layer comprising CoMnGe.

In some embodiments, the DFG layer 122 comprises a first layer comprising at least one of cobalt, iron, or a cobalt-iron alloy; a thicker second layer comprising a cobalt alloy denoted as CoXM, where X is, for example, manganese or iron, and M is, for example, germanium, aluminum, silicon, or gallium; and a third layer comprising at least one of cobalt, iron, or a cobalt-iron alloy. In some such embodiments, the first layer is between about 0.2 nm and about 1 nm thick, the second layer is between about 2 nm and about 8 nm thick, and the third layer is between about 0.2 nm and about 1 nm thick. FIGS. 9A and 9D-9F, discussed below, illustrate exemplary embodiments in which the DFG layer 122 comprises a first layer comprising CoFe, a second layer comprising CoMnGe, and a third layer comprising CoFe.

In some embodiments, the DFG layer 122 comprises a first layer comprising at least one of cobalt or a cobalt-iron alloy, and a second layer comprising at least one of nickel, iron, or a nickel-iron alloy. In some such embodiments, the thickness of the first layer is between about 0.2 nm and about 1 nm, and the thickness of the second layer is between about 2 nm and about 8 nm. FIGS. 8B, 8C, 8E through 8J, 9B, and 9C, discussed below, illustrate exemplary embodiments in which the DFG layer 122 comprises a first layer comprising cobalt and a second layer comprising NiFe.

In some embodiments, the thickness of the DFG layer 122, whether comprising a single layer or multiple layers, is between about 3 nm and about 9 nm.

In some embodiments, whether MP-integrated or TS-integrated, the DFG layer 122 comprises CoFe, NiFe, or a Heusler alloy. As would be appreciated by a person having ordinary skill in the art, a Heusler alloy is a ferromagnetic metal alloy based on a Heusler phase. Heusler phases are alloys (or, more generally, solid-state compounds exhibiting metallic bonding, defined stoichiometry, and ordered crystal structure) having a particular composition and face-centered cubic crystal structure. Heusler phases are ferromagnetic because of the double-exchange mechanism between neighboring magnetic ions, which are typically manganese ions that sit at the body centers of the cubic structure and carry most of the magnetic moment of the alloy.

In either a MP-integrated configuration or a TS-integrated configuration, a magnetic saturation flux density of the DFG layer 122 may be between about 0.5 Tesla and 2.4 Tesla.

One advantage of the exemplary embodiments illustrated in FIGS. 5A and 5B, and of MP-integrated embodiments in general, may be that because the DFG layer 122 is close to the main pole 110, the DFG layer DC component 123 may provide a stronger boost to the write field 115 than in TS-integrated embodiments in which the DFG layer 122 is further away from the main pole 110. On the other hand, one advantage of the exemplary embodiments illustrated in FIGS. 6A and 6B, and of TS-integrated embodiments in general, may be that the DFG layer 122 can be grown on a conventional seed layer, namely the non-magnetic layer 150, which may promote stable crystal growth, whereas in MP-integrated embodiments, the spacer 125 is grown on either the main pole 110 or the optional notch 140, which may be more challenging.

FIG. 8A is a view of the ABS 105 of an exemplary MP-integrated writer 101 in accordance with some embodiments. Like the MP-integrated writer 101 shown in FIG. 5B, the exemplary writer 101 illustrated in FIG. 8A includes a main pole 110, the magnetic notch 140, a spacer 125, a DFG layer 122, a non-magnetic layer 150, and a trailing shield 130.

The magnetic notch 140, which is disposed between and adjacent to the main pole 110 and the spacer 125, comprises FeCo and is approximately 3 nm thick. In some embodiments, the magnetic notch 140 comprises $Fe_{70}CO_{30}$.

In the exemplary embodiment illustrated in FIG. 8A, the spacer 125, which is disposed between and adjacent to the magnetic notch 140 and the DFG layer 122, comprises copper and is approximately 3 nm thick.

The DFG layer 122, which is disposed between and adjacent to the spacer 125 and a non-magnetic layer 150, comprises a first layer 180 comprising CoFe and a second layer 182 comprising CoMnGe. For example, the first layer 180 may comprise $Co_{50}Fe_{50}$, and the second layer 182 may comprise $Co_{53}Mn_{23}Ge_{24}$. In the embodiment shown in FIG. 8A, the first layer 180, which abuts the spacer 125, is about 1 nm thick, and the second layer 182, which abuts the non-magnetic layer 150, is about 2.5 nm thick.

The non-magnetic layer 150 comprises two layers, 185 and 186, in the exemplary embodiment of FIG. 8A and is disposed between and adjacent to the DFG layer 122 and the trailing shield 130. The first layer 185 comprises ruthenium and is about 0.5 nm thick. The second layer 186 comprises nickel or chromium (or both nickel and chromium) and is approximately 13 nm thick.

The trailing shield 130, which abuts the non-magnetic layer 150, comprises FeCo. In some embodiments, the trailing shield 130 comprises $Fe_{70}Co_{30}$.

The effective write gap 190, which comprises the spacer 125, the DFG layer 122, and the non-magnetic layer 150, is approximately 20 nm thick in the exemplary embodiment illustrated in FIG. 8A.

Figure 8B:
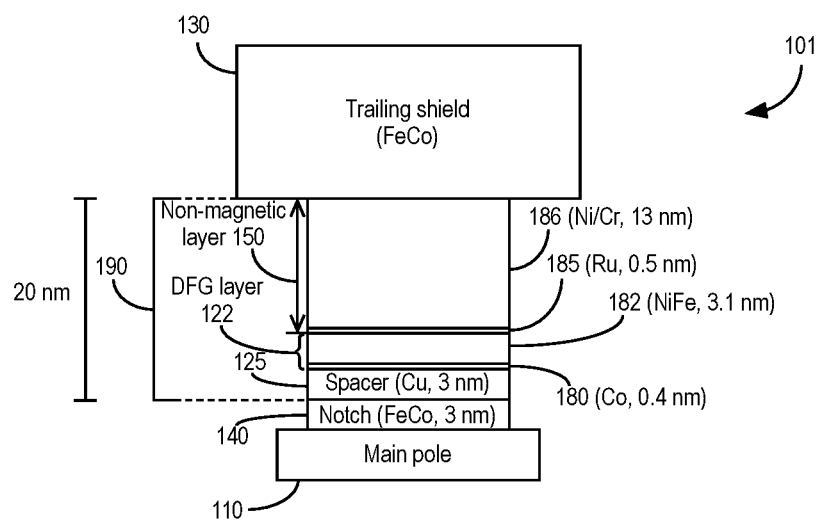
FIG. 8B is a view of the ABS of another exemplary MP-integrated writer in accordance with some embodiments.

FIG. 8B is a view of the ABS 105 of another exemplary MP-integrated writer 101 in accordance with some embodiments. Like the exemplary embodiment shown in FIG. 8A, the exemplary writer 101 illustrated in FIG. 8B includes a main pole 110, the magnetic notch 140, a spacer 125, a DFG layer 122, a non-magnetic layer 150, and a trailing shield 130.

The magnetic notch 140, which is disposed between and adjacent to the main pole 110 and the spacer 125, comprises FeCo and is approximately 3 nm thick. In some embodiments, the magnetic notch 140 comprises $Fe_{70}Co_{30}$.

The spacer 125, which is disposed between and adjacent to the magnetic notch 140 and the DFG layer 122, comprises copper and is approximately 3 nm thick.

The DFG layer 122, which is disposed between and adjacent to the spacer 125 and the non-magnetic layer 150, comprises a first layer 180 comprising Co and a second layer 182 comprising NiFe. For example, the second layer 182 may comprise $Ni_{80}Fe_{20}$. In the embodiment shown in FIG. 8B, the first layer 180, which abuts the spacer 125, is about 0.4 nm thick, and the second layer 182, which abuts the non-magnetic layer 150, is about 3.1 nm thick. Thus, the thickness of the DFG layer 122 of the exemplary writer 101 shown in FIG. 8B is approximately 3.5 nm, which is the same as the thickness of the DFG layer 122 of the exemplary writer shown in FIG. 8A, but the materials in and thicknesses of the first and second layers 180, 182 differ between the two exemplary embodiments of FIGS. 8A and 8B.

The non-magnetic layer 150 comprises two layers, 185 and 186, in the exemplary embodiment of FIG. 8B and is disposed between and adjacent to the DFG layer 122 and the trailing shield 130. The first layer 185 comprises ruthenium and is about 0.5 nm thick. The second layer 186 comprises nickel or chromium (or both nickel and chromium) and is approximately 13 nm thick.

The trailing shield 130, which abuts the non-magnetic layer 150, comprises FeCo. For example, the trailing shield 130 may comprise $Fe_{70}CO_{30}$.

As in FIG. 8A, the effective write gap 190 of the exemplary embodiment illustrated in FIG. 8B, which comprises the spacer 125, the DFG layer 122, and the non-magnetic layer 150, is approximately 20 nm thick.

Figure 8C:
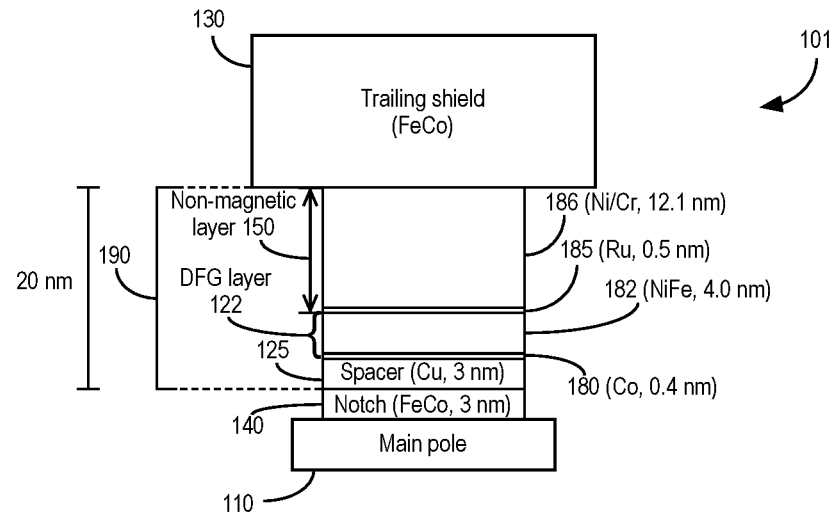
FIG. 8C is a view of the ABS of another exemplary MP-integrated writer in accordance with some embodiments.
Figure 8D:
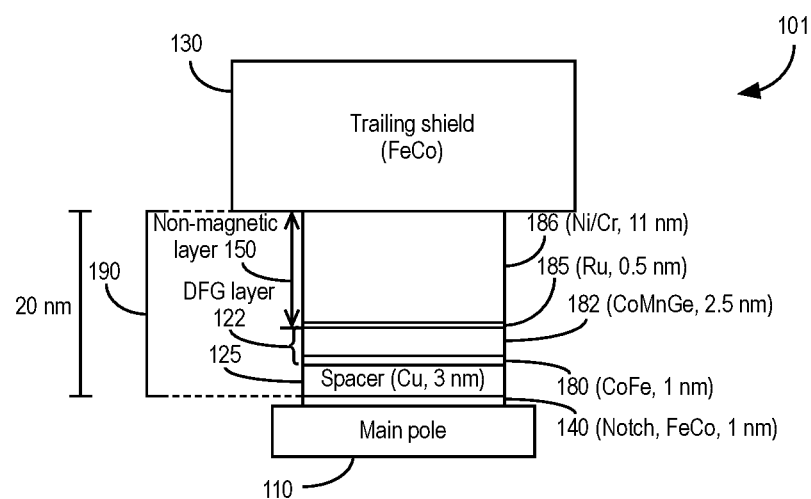
FIG. 8D is a view of the ABS of another exemplary MP-integrated writer in accordance with some embodiments.

FIG. 8C is a view of the ABS 105 of another exemplary MP-integrated writer 101 in accordance with some embodiments. Like the exemplary embodiments shown in FIGS. 8A and 8B, the exemplary writer 101 illustrated in FIG. 8C includes a main pole 110, the magnetic notch 140, a spacer 125, a DFG layer 122, a non-magnetic layer 150, and a trailing shield 130.

The magnetic notch 140, which is disposed between and adjacent to the main pole 110 and the spacer 125, comprises FeCo and is approximately 3 nm thick. In some embodiments, the magnetic notch 140 comprises $Fe_{70}CO_{30}$.

The spacer 125, which is disposed between and adjacent to the magnetic notch 140 and the DFG layer 122, comprises copper and is approximately 3 nm thick.

The DFG layer 122, which is disposed between and adjacent to the spacer 125 and the non-magnetic layer 150, comprises a first layer 180 comprising Co and a second layer 182 comprising NiFe. For example, the second layer 182 may comprise $Ni_{80}Fe_{20}$. In the embodiment shown in FIG. 8C, the first layer 180, which abuts the spacer 125, is about 0.4 nm thick, and the second layer 182, which abuts the non-magnetic layer 150, is about 4 nm thick. Thus, the DFG layer 122 of the exemplary writer 101 shown in FIG. 8C is approximately 4.4 nm, which is thicker than the DFG layers 122 in the exemplary embodiments illustrated in FIGS. 8A and 8B.

The non-magnetic layer 150 comprises two layers, 185 and 186, in the exemplary embodiment shown in FIG. 8C and is disposed between and adjacent to the DFG layer 122 and the trailing shield 130. The first layer 185 comprises ruthenium and is about 0.5 nm thick. The second layer 186 comprises nickel or chromium (or both nickel and chromium) and is approximately 12.1 nm thick.

The trailing shield 130, which abuts the non-magnetic layer 150, comprises FeCo. For example, the trailing shield 130 may comprise $Fe_{70}CO_{30}$.

As in the embodiments illustrated in FIGS. 8A and 8B, the effective write gap 190 of the exemplary embodiment illustrated in FIG. 8C, which comprises the spacer 125, the DFG layer 122, and the non-magnetic layer 150, is approximately 20 nm thick.

FIG. 8D is a view of the ABS 105 of another exemplary MP-integrated writer 101 in accordance with some embodiments. Like the exemplary embodiments shown in FIGS. 8A through 8C, the exemplary writer 101 illustrated in FIG. 8D includes a main pole 110, the magnetic notch 140, a spacer 125, a DFG layer 122, a non-magnetic layer 150, and a trailing shield 130.

The magnetic notch 140, which is disposed between and adjacent to the main pole 110 and the spacer 125, comprises FeCo, but in this case the magnetic notch 140 is thinner than in the embodiments shown in FIGS. 8A through 8C at approximately 1 nm thick. In some embodiments, the magnetic notch 140 comprises $Fe_{70}Co_{30}$.

The spacer 125, which is disposed between and adjacent to the magnetic notch 140 and the DFG layer 122, comprises copper and is approximately 3 nm thick.

The DFG layer 122, which is disposed between and adjacent to the spacer 125 and the non-magnetic layer 150, comprises a first layer 180 comprising CoFe and a second layer 182 comprising CoMnGe. For example, the first layer 180 may comprise $Co_{50}Fe_{50}$, and the second layer 182 may comprise $Co_{53}Mn_{23}Ge_{24}$. In the embodiment shown in FIG. 8D, the first layer 180, which abuts the spacer 125, is about 1 nm thick, and the second layer 182, which abuts the non-magnetic layer 150, is about 2.5 nm thick. Thus, the DFG layer 122 of FIG. 8D is identical to the DFG layer 122 of FIG. 8A, but it is closer to the main pole 110 than the DFG layer 122 of FIG. 8A because the magnetic notch 140 is thinner in the exemplary embodiment illustrated in FIG. 8D.

The non-magnetic layer 150 comprises two layers, 185 and 186, in the exemplary embodiment illustrated in FIG. 8D and is disposed between and adjacent to the DFG layer 122 and the trailing shield 130. The first layer 185 comprises ruthenium and is about 0.5 nm thick. The second layer 186 comprises nickel or chromium (or both nickel and chromium) and is approximately 11 nm thick.

The trailing shield 130, which abuts the non-magnetic layer 150, comprises FeCo. For example, the trailing shield 130 may comprise $Fe_{70}Co_{30}$.

As in the embodiments illustrated in FIGS. 8A through 8C, the effective write gap 190 of the exemplary embodiment illustrated in FIG. 8D, which comprises the spacer 125, the DFG layer 122, and the non-magnetic layer 150, is approximately 20 nm thick.

Figure 8E:
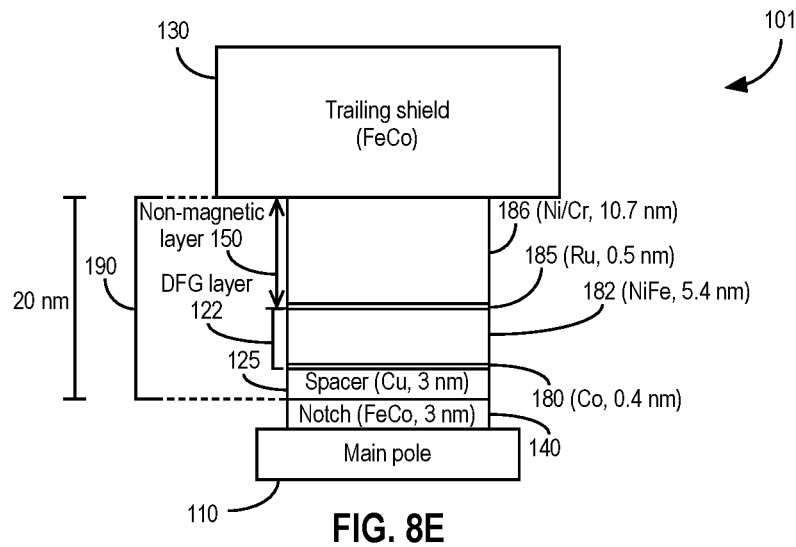
FIG. 8E is a view of the ABS of another exemplary MP-integrated writer in accordance with some embodiments.

FIG. 8E is a view of the ABS 105 of another exemplary MP-integrated writer 101 in accordance with some embodiments. Like the exemplary embodiments shown in FIGS. 8A through 8D, the exemplary writer 101 illustrated in FIG. 8E includes a main pole 110, the magnetic notch 140, a spacer 125, a DFG layer 122, a non-magnetic layer 150, and a trailing shield 130.

The magnetic notch 140, which is disposed between and adjacent to the main pole 110 and the spacer 125, comprises FeCo and is approximately 3 nm thick. In some embodiments, the magnetic notch 140 comprises $Fe_{70}CO_{30}$.

The spacer 125, which is disposed between and adjacent to the magnetic notch 140 and the DFG layer 122, comprises copper and is approximately 3 nm thick.

The DFG layer 122, which is disposed between and adjacent to the spacer 125 and the non-magnetic layer 150, comprises a first layer 180 comprising Co and a second layer 182 comprising NiFe. For example, the second layer 182 may comprise $Ni_{95}Fe_5$. In the embodiment shown in FIG. 8E, the first layer 180, which abuts the spacer 125, is about 0.4 nm thick, and the second layer 182, which abuts the non-magnetic layer 150, is about 5.4 nm thick. Thus, the DFG layer 122 of the exemplary embodiment illustrated in FIG. 8E is approximately 5.8 nm thick.

The non-magnetic layer 150 comprises two layers, 185 and 186, in the exemplary embodiment of FIG. 8E and is disposed between and adjacent to the DFG layer 122 and the trailing shield 130. The first layer 185 comprises ruthenium and is about 0.5 nm thick. The second layer 186 comprises nickel or chromium (or both nickel and chromium) and is approximately 10.7 nm thick.

The trailing shield 130, which abuts the non-magnetic layer 150, comprises FeCo. For example, the trailing shield 130 may comprise $Fe_{70}CO_{30}$.

The effective write gap 190 of the exemplary embodiment illustrated in FIG. 8E, which comprises the spacer 125, the DFG layer 122, and the non-magnetic layer 150, is approximately 20 nm thick.

Figure 8F:
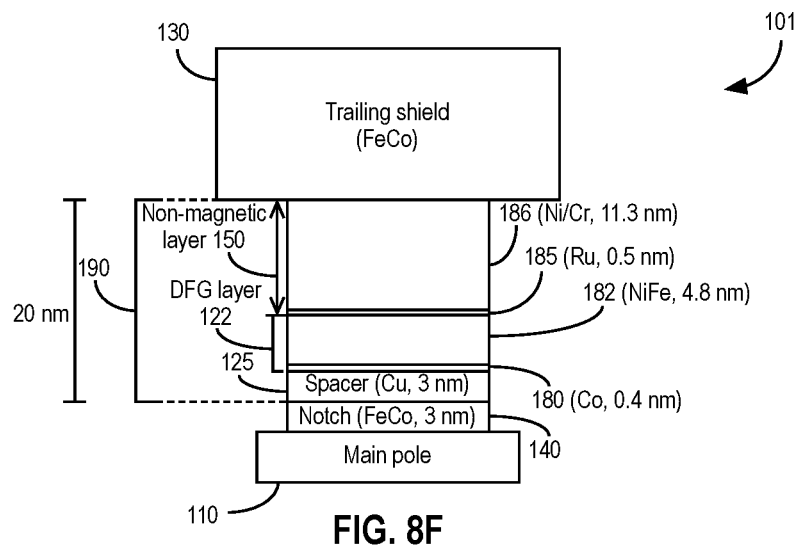
FIG. 8F is a view of the ABS of another exemplary MP-integrated writer in accordance with some embodiments.

FIG. 8F is a view of the ABS 105 of another exemplary MP-integrated writer 101 in accordance with some embodiments. Like the exemplary embodiments shown in FIGS. 8A through 8E, the exemplary writer 101 illustrated in FIG. 8F includes a main pole 110, the magnetic notch 140, a spacer 125, a DFG layer 122, a non-magnetic layer 150, and a trailing shield 130.

The magnetic notch 140, which is disposed between and adjacent to the main pole 110 and the spacer 125, comprises FeCo and is approximately 3 nm thick. In some embodiments, the magnetic notch 140 comprises $Fe_{70}CO_{30}$.

The spacer 125, which is disposed between and adjacent to the magnetic notch 140 and the DFG layer 122, comprises copper and is approximately 3 nm thick.

The DFG layer 122, which is disposed between and adjacent to the spacer 125 and the non-magnetic layer 150, comprises a first layer 180 comprising Co and a second layer 182 comprising NiFe. For example, the second layer 182 may comprise $Ni_{90}Fe_{10}$. In the embodiment shown in FIG. 8F, the first layer 180, which abuts the spacer 125, is about 0.4 nm thick, and the second layer 182, which abuts the non-magnetic layer 150, is about 4.8 nm thick. Thus, the DFG layer 122 of the exemplary embodiment illustrated in FIG. 8F is approximately 5.2 nm thick.

The non-magnetic layer 150 comprises two layers, 185 and 186, in the exemplary embodiment of FIG. 8F and is disposed between and adjacent to the DFG layer 122 and the trailing shield 130. The first layer 185 comprises ruthenium and is about 0.5 nm thick. The second layer 186 comprises nickel or chromium (or both nickel and chromium) and is approximately 11.3 nm thick.

The trailing shield 130, which abuts the non-magnetic layer 150, comprises FeCo. For example, the trailing shield 130 may comprise $Fe_{70}CO_{30}$.

The effective write gap 190 of the exemplary embodiment illustrated in FIG. 8F, which comprises the spacer 125, the DFG layer 122, and the non-magnetic layer 150, is approximately 20 nm thick.

Figure 8G:
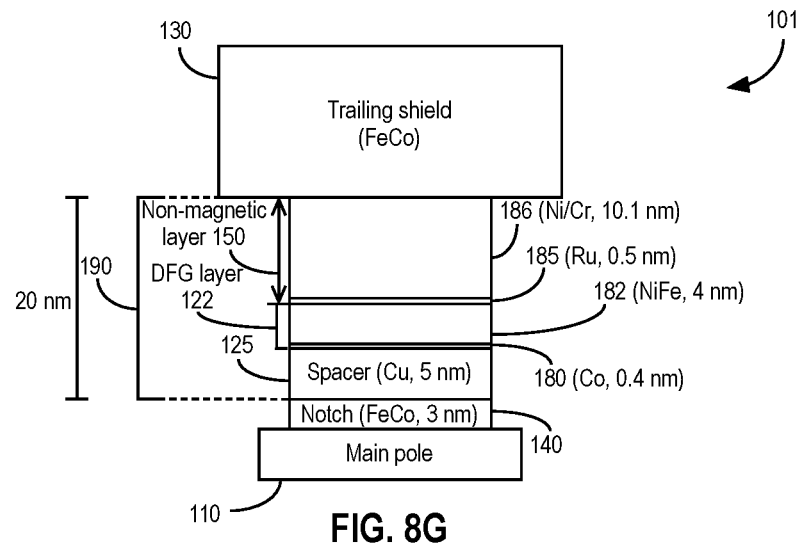
FIG. 8G is a view of the ABS of another exemplary MP-integrated writer in accordance with some embodiments.

FIG. 8G is a view of the ABS 105 of another exemplary MP-integrated writer 101 in accordance with some embodiments. Like the exemplary embodiments shown in FIGS. 8A through 8F, the exemplary writer 101 illustrated in FIG. 8G includes a main pole 110, the magnetic notch 140, a spacer 125, a DFG layer 122, a non-magnetic layer 150, and a trailing shield 130.

The magnetic notch 140, which is disposed between and adjacent to the main pole 110 and the spacer 125, comprises FeCo and is approximately 3 nm thick. In some embodiments, the magnetic notch 140 comprises $Fe_{70}CO_{30}$.

The spacer 125, which is disposed between and adjacent to the magnetic notch 140 and the DFG layer 122, comprises copper, but in the exemplary embodiment illustrated in FIG. 8G, the spacer 125 is thicker than in the embodiments illustrated in FIGS. 8A through 8F. In the exemplary embodiment illustrated in FIG. 8G, the spacer 125 is approximately 5 nm thick.

The DFG layer 122, which is disposed between and adjacent to the spacer 125 and the non-magnetic layer 150, comprises a first layer 180 comprising Co and a second layer 182 comprising NiFe. For example, the second layer 182 may comprise $Ni_{80}Fe_{20}$. In the embodiment shown in FIG. 8G, the first layer 180, which abuts the spacer 125, is about 0.4 nm thick, and the second layer 182, which abuts the non-magnetic layer 150, is about 4 nm thick. Thus, the DFG layer 122 of the exemplary embodiment illustrated in FIG. 8G is approximately 4.4 nm thick.

The non-magnetic layer 150 comprises two layers, 185 and 186, in the exemplary embodiment of FIG. 8G and is disposed between and adjacent to the DFG layer 122 and the trailing shield 130. The first layer 185 comprises ruthenium and is about 0.5 nm thick. The second layer 186 comprises nickel or chromium (or both nickel and chromium) and is approximately 10.1 nm thick.

The trailing shield 130, which abuts the non-magnetic layer 150, comprises FeCo. For example, the trailing shield 130 may comprise $Fe_{70}CO_{30}$.

The effective write gap 190 of the exemplary embodiment illustrated in FIG. 8G, which comprises the spacer 125, the DFG layer 122, and the non-magnetic layer 150, is approximately 20 nm thick.

Figure 8H:
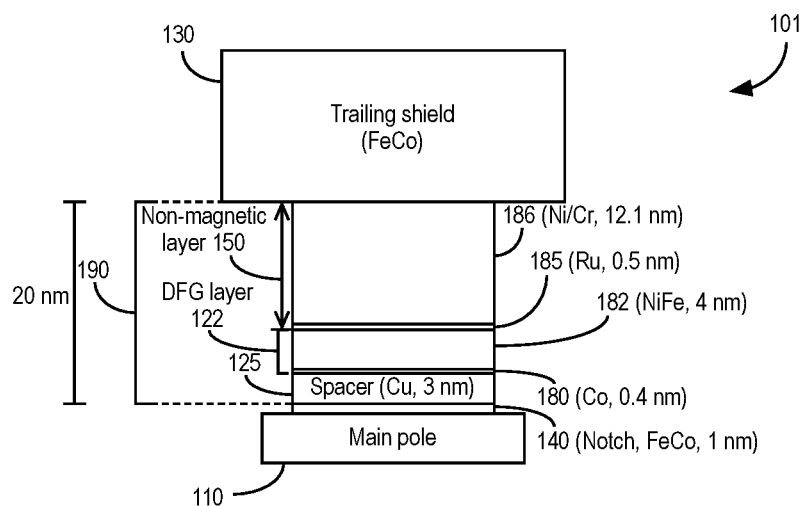
FIG. 8H is a view of the ABS of another exemplary MP-integrated writer in accordance with some embodiments.

FIG. 8H is a view of the ABS 105 of another exemplary MP-integrated writer 101 in accordance with some embodiments. Like the exemplary embodiments shown in FIGS. 8A through 8G, the exemplary writer 101 illustrated in FIG. 8H includes a main pole 110, the magnetic notch 140, a spacer 125, a DFG layer 122, a non-magnetic layer 150, and a trailing shield 130.

The magnetic notch 140, which is disposed between and adjacent to the main pole 110 and the spacer 125, comprises FeCo and is approximately 1 nm thick. In some embodiments, the magnetic notch 140 comprises $Fe_{70}CO_{30}$.

The spacer 125, which is disposed between and adjacent to the magnetic notch 140 and the DFG layer 122, comprises copper and is approximately 3 nm thick.

The DFG layer 122, which is disposed between and adjacent to the spacer 125 and the non-magnetic layer 150, comprises a first layer 180 comprising Co and a second layer 182 comprising NiFe. For example, the second layer 182 may comprise $Ni_{80}Fe_{20}$. In the embodiment shown in FIG. 8H, the first layer 180, which abuts the spacer 125, is about 0.4 nm thick, and the second layer 182, which abuts the non-magnetic layer 150, is about 4 nm thick. Thus, the DFG layer 122 of the exemplary embodiment illustrated in FIG. 8H is approximately 4.4 nm thick.

The non-magnetic layer 150 comprises two layers, 185 and 186, in the exemplary embodiment of FIG. 8H and is disposed between and adjacent to the DFG layer 122 and the trailing shield 130. The first layer 185 comprises ruthenium and is about 0.5 nm thick. The second layer 186 comprises nickel or chromium (or both nickel and chromium) and is approximately 12.1 nm thick.

The trailing shield 130, which abuts the non-magnetic layer 150, comprises FeCo. For example, the trailing shield 130 may comprise $Fe_{70}CO_{30}$.

The effective write gap 190 of the exemplary embodiment illustrated in FIG. 8H, which comprises the spacer 125, the DFG layer 122, and the non-magnetic layer 150, is approximately 20 nm thick.

Figure 8I:
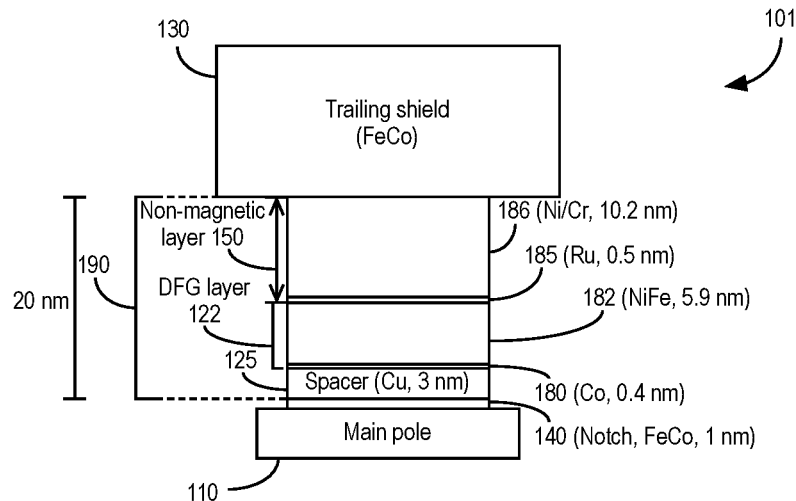
FIG. 8I is a view of the ABS of another exemplary MP-integrated writer in accordance with some embodiments.

FIG. 8I is a view of the ABS 105 of another exemplary MP-integrated writer 101 in accordance with some embodiments. Like the exemplary embodiments shown in FIGS. 8A through 8H, the exemplary writer 101 illustrated in FIG. 8H includes a main pole 110, the magnetic notch 140, a spacer 125, a DFG layer 122, a non-magnetic layer 150, and a trailing shield 130.

The magnetic notch 140, which is disposed between and adjacent to the main pole 110 and the spacer 125, comprises FeCo and is approximately 1 nm thick. In some embodiments, the magnetic notch 140 comprises $Fe_{70}Co_{30}$.

The spacer 125, which is disposed between and adjacent to the magnetic notch 140 and the DFG layer 122, comprises copper and is approximately 3 nm thick.

The DFG layer 122, which is disposed between and adjacent to the spacer 125 and the non-magnetic layer 150, comprises a first layer 180 comprising Co and a second layer 182 comprising NiFe. For example, the second layer 182 may comprise $Ni_{80}Fe_{20}$. In the embodiment shown in FIG. 8I, the first layer 180, which abuts the spacer 125, is about 0.4 nm thick, and the second layer 182, which abuts the non-magnetic layer 150, is about 5.9 nm thick. Thus, the DFG layer 122 of the exemplary embodiment illustrated in FIG. 8I is approximately 6.3 nm thick.

The non-magnetic layer 150 comprises two layers, 185 and 186, in the exemplary embodiment of FIG. 8I and is disposed between and adjacent to the DFG layer 122 and the trailing shield 130. The first layer 185 comprises ruthenium and is about 0.5 nm thick. The second layer 186 comprises nickel or chromium (or both nickel and chromium) and is approximately 10.2 nm thick.

The trailing shield 130, which abuts the non-magnetic layer 150, comprises FeCo. For example, the trailing shield 130 may comprise $Fe_{70}Co_{30}$.

The effective write gap 190 of the exemplary embodiment illustrated in FIG. 8I, which comprises the spacer 125, the DFG layer 122, and the non-magnetic layer 150, is approximately 20 nm thick.

Figure 8J:
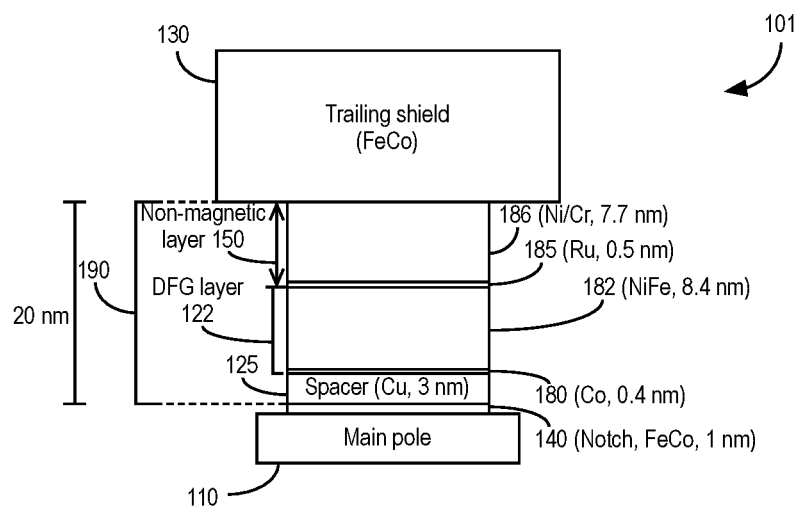
FIG. 8J is a view of the ABS of another exemplary MP-integrated writer in accordance with some embodiments.

FIG. 8J is a view of the ABS 105 of another exemplary MP-integrated writer 101 in accordance with some embodiments. Like the exemplary embodiments shown in FIGS. 8A through 8I, the exemplary writer 101 illustrated in FIG. 8J includes a main pole 110, the magnetic notch 140, a spacer 125, a DFG layer 122, a non-magnetic layer 150, and a trailing shield 130.

The magnetic notch 140, which is disposed between and adjacent to the main pole 110 and the spacer 125, comprises FeCo and is approximately 1 nm thick. In some embodiments, the magnetic notch 140 comprises $Fe_{70}Co_{30}$.

The spacer 125, which is disposed between and adjacent to the magnetic notch 140 and the DFG layer 122, comprises copper and is approximately 3 nm thick.

The DFG layer 122, which is disposed between and adjacent to the spacer 125 and the non-magnetic layer 150, comprises a first layer 180 comprising Co and a second layer 182 comprising NiFe. For example, the second layer 182 may comprise $Ni_{80}Fe_{20}$. In the embodiment shown in FIG. 8J, the first layer 180, which abuts the spacer 125, is about 0.4 nm thick, and the second layer 182, which abuts the non-magnetic layer 150, is about 8.4 nm thick. Thus, the DFG layer 122 of the exemplary embodiment illustrated in FIG. 8J is approximately 8.8 nm thick.

The non-magnetic layer 150 comprises two layers, 185 and 186, in the exemplary embodiment of FIG. 8J and is disposed between and adjacent to the DFG layer 122 and the trailing shield 130. The first layer 185 comprises ruthenium and is about 0.5 nm thick. The second layer 186 comprises nickel or chromium (or both nickel and chromium) and is approximately 7.7 nm thick.

The trailing shield 130, which abuts the non-magnetic layer 150, comprises FeCo. For example, the trailing shield 130 may comprise $Fe_{70}Co_{30}$.

The effective write gap 190 of the exemplary embodiment illustrated in FIG. 8J, which comprises the spacer 125, the DFG layer 122, and the non-magnetic layer 150, is approximately 20 nm thick.

Figure 9A:
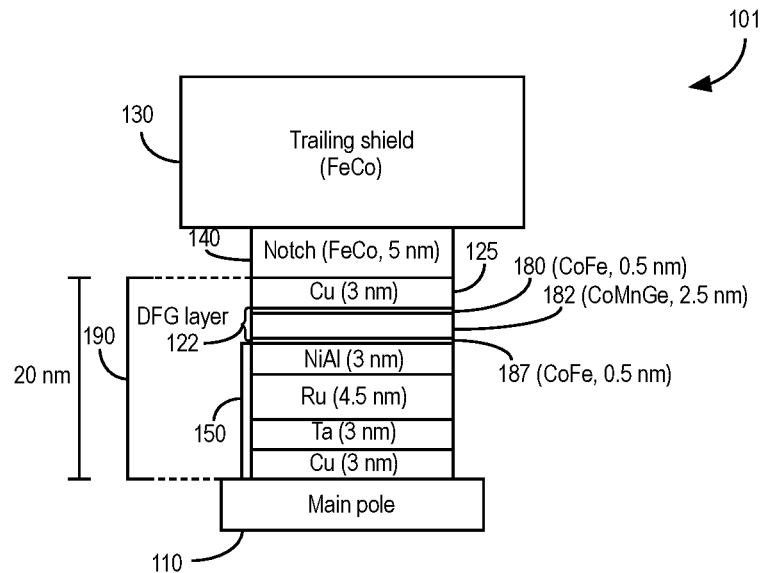
FIG. 9A is a view of the ABS of an exemplary TS-integrated writer in accordance with some embodiments.

FIG. 9A is a view of the ABS 105 of an exemplary TS-integrated writer 101 in accordance with some embodiments. Like the TS-integrated writer 101 shown in FIG. 6B, the exemplary writer 101 illustrated in FIG. 9A includes a main pole 110, a non-magnetic layer 150, a DFG layer 122, a spacer 125, the magnetic notch 140, and a trailing shield 130.

The non-magnetic layer 150 is disposed between and adjacent to the main pole 110 and the DFG layer 122. In the embodiment illustrated in FIG. 9A, the non-magnetic layer 150 includes four sublayers: (1) a copper sublayer that is approximately 3 nm thick, (2) a tantalum sublayer that is approximately 3 nm thick, (3) a ruthenium sublayer that is approximately 4.5 nm thick, and (4) a NiAl sublayer that is approximately 3 nm thick. Thus, the non-magnetic layer 150 is approximately 13.5 nm thick.

The DFG layer 122, which is disposed between and adjacent to the non-magnetic layer 150 and the spacer 125, comprises a first layer 180 comprising CoFe, a second layer 182 comprising CoMnGe, and a third layer 187 comprising CoFe. For example, the first layer 180 may comprise $Co_{50}Fe_{50}$, the second layer 182 may comprise $Co_{53}Mn_{23}Ge_{24}$, and the third layer may comprise $Co_{50}Fe_{50}$. In the embodiment shown in FIG. 9A, the first layer 180, which abuts the spacer 125, is about 0.5 nm thick, the second layer 182 is about 2.5 nm thick, and the third layer 187, which abuts the non-magnetic layer 150, is about 0.5 nm thick. Therefore, the DFG layer 122 of the exemplary embodiment illustrated in FIG. 9A is approximately 3.5 nm thick.

The spacer 125, which is disposed between and adjacent to the magnetic notch 140 and the DFG layer 122, comprises copper and is approximately 3 nm thick.

The magnetic notch 140, which is disposed between and adjacent to the trailing shield 130 and the spacer 125, comprises FeCo and is approximately 5 nm thick. In some embodiments, the magnetic notch 140 comprises $Fe_{70}Co_{30}$.

The trailing shield 130 abuts the magnetic notch 140. In the exemplary embodiment illustrated in FIG. 9A, the trailing shield 130 comprises FeCo. For example, the trailing shield 130 may comprise $Fe_{70}Co_{30}$.

The effective write gap 190 of the exemplary embodiment illustrated in FIG. 9A, which comprises the spacer 125, the DFG layer 122, and the non-magnetic layer 150, is approximately 20 nm thick.

Figure 9B:
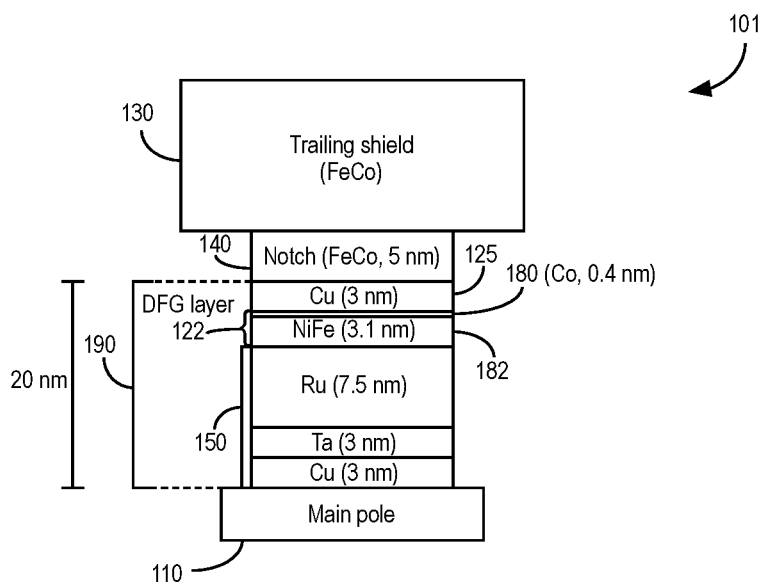
FIG. 9B is a view of the ABS of another exemplary TS-integrated writer in accordance with some embodiments.

FIG. 9B is a view of the ABS 105 of an exemplary TS-integrated writer 101 in accordance with some embodiments. Like the TS-integrated writer 101 shown in FIG. 9A, the exemplary writer 101 illustrated in FIG. 9B includes a main pole 110, a non-magnetic layer 150, a DFG layer 122, a spacer 125, the magnetic notch 140, and a trailing shield 130.

The non-magnetic layer 150 is disposed between and adjacent to the main pole 110 and the DFG layer 122. In the embodiment illustrated in FIG. 9B, the non-magnetic layer 150 includes three sublayers: (1) a copper sublayer that is approximately 3 nm thick, (2) a tantalum sublayer that is approximately 3 nm thick, and (3) a ruthenium sublayer that is approximately 7.5 nm thick. Thus, the non-magnetic layer 150 is approximately 13.5 nm thick.

The DFG layer 122, which is disposed between and adjacent to the non-magnetic layer 150 and the spacer 125, comprises a first layer 180 comprising Co and a second layer 182 comprising NiFe. In some embodiments, the second layer 182 may comprise $Ni_{80}Fe_{20}$. In the embodiment shown in FIG. 9B, the first layer 180, which abuts the spacer 125, is about 0.4 nm thick, and the second layer 182, which abuts the non-magnetic layer 150, is about 3.1 nm thick. Therefore, the DFG layer 122 of the exemplary embodiment illustrated in FIG. 9B is approximately 3.5 nm thick.

The spacer 125, which is disposed between and adjacent to the magnetic notch 140 and the DFG layer 122, comprises copper and is approximately 3 nm thick.

The magnetic notch 140, which is disposed between and adjacent to the trailing shield 130 and the spacer 125, comprises FeCo and is approximately 5 nm thick. In some embodiments, the magnetic notch 140 comprises $Fe_{70}Co_{30}$.

The trailing shield 130 abuts the magnetic notch 140. In the exemplary embodiment illustrated in FIG. 9B, the trailing shield 130 comprises FeCo. For example, the trailing shield 130 may comprise $Fe_{70}CO_{30}$.

The effective write gap 190 of the exemplary embodiment illustrated in FIG. 9B, which comprises the spacer 125, the DFG layer 122, and the non-magnetic layer 150, is approximately 20 nm thick.

Figure 9C:
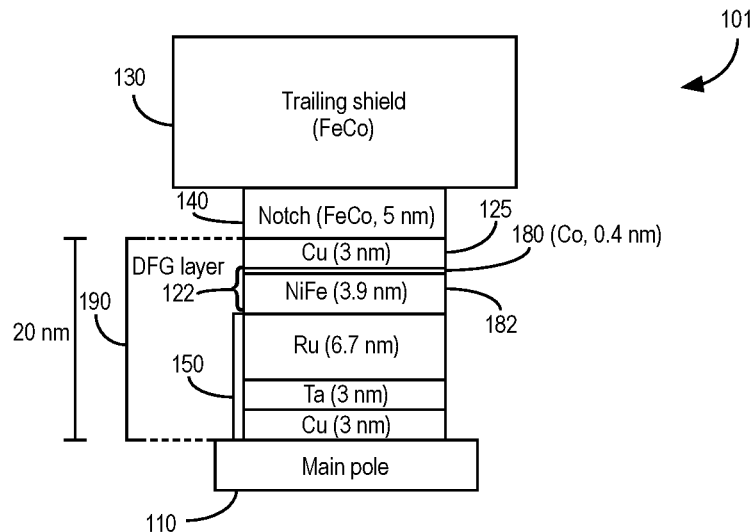
FIG. 9C is a view of the ABS of another exemplary TS-integrated writer in accordance with some embodiments.

FIG. 9C is a view of the ABS 105 of an exemplary TS-integrated writer 101 in accordance with some embodiments. Like the TS-integrated writers 101 shown in FIGS. 9A and 9B, the exemplary writer 101 illustrated in FIG. 9C includes a main pole 110, a non-magnetic layer 150, a DFG layer 122, a spacer 125, the magnetic notch 140, and a trailing shield 130.

The non-magnetic layer 150 is disposed between and adjacent to the main pole 110 and the DFG layer 122. In the embodiment illustrated in FIG. 9C, the non-magnetic layer 150 includes three sublayers: (1) a copper sublayer that is approximately 3 nm thick, (2) a tantalum sublayer that is approximately 3 nm thick, and (3) a ruthenium sublayer that is approximately 6.7 nm thick. Thus, the non-magnetic layer 150 is approximately 12.7 nm thick.

The DFG layer 122, which is disposed between and adjacent to the non-magnetic layer 150 and the spacer 125, comprises a first layer 180 comprising Co and a second layer 182 comprising NiFe. In some embodiments, the second layer 182 comprises $Ni_{80}Fe_{20}$. In the embodiment shown in FIG. 9C, the first layer 180, which abuts the spacer 125, is about 0.4 nm thick, and the second layer 182, which abuts the non-magnetic layer 150, is about 3.9 nm thick. Therefore, the DFG layer 122 of the exemplary embodiment illustrated in FIG. 9C is approximately 4.3 nm thick.

The spacer 125, which is disposed between and adjacent to the magnetic notch 140 and the DFG layer 122, comprises copper and is approximately 3 nm thick.

The magnetic notch 140, which is disposed between and adjacent to the trailing shield 130 and the spacer 125, comprises FeCo and is approximately 5 nm thick. In some embodiments, the magnetic notch 140 comprises $Fe_{70}Co_{30}$.

The trailing shield 130 abuts the magnetic notch 140. In the exemplary embodiment illustrated in FIG. 9C, the trailing shield 130 comprises FeCo. For example, the trailing shield 130 may comprise $Fe_{70}CO_{30}$.

The effective write gap 190 of the exemplary embodiment illustrated in FIG. 9C, which comprises the spacer 125, the DFG layer 122, and the non-magnetic layer 150, is approximately 20 nm thick.

Figure 9D:
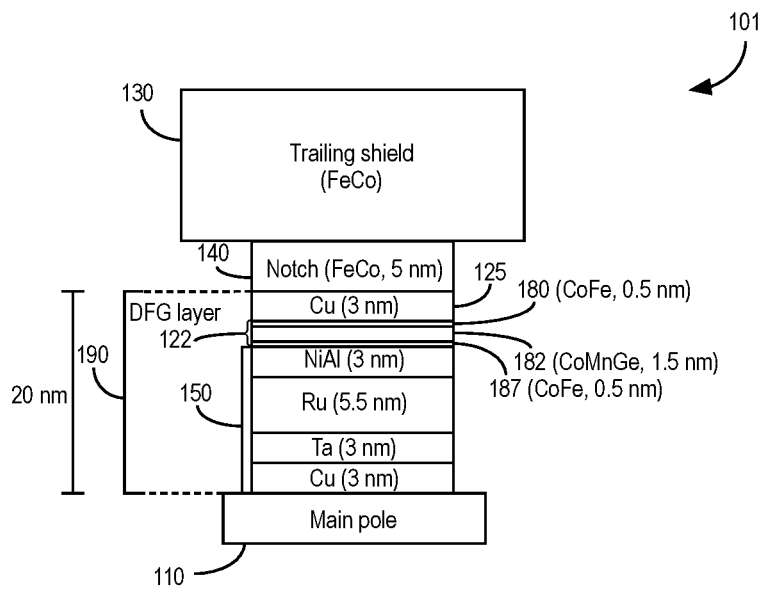
FIG. 9D is a view of the ABS of another exemplary TS-integrated writer in accordance with some embodiments.

FIG. 9D is a view of the ABS 105 of an exemplary TS-integrated writer 101 in accordance with some embodiments. Like the TS-integrated writers 101 shown in FIGS. 9A through 9C, the exemplary writer 101 illustrated in FIG. 9D includes a main pole 110, a non-magnetic layer 150, a DFG layer 122, a spacer 125, the magnetic notch 140, and a trailing shield 130.

The non-magnetic layer 150 is disposed between and adjacent to the main pole 110 and the DFG layer 122. In the embodiment illustrated in FIG. 9D, the non-magnetic layer 150 includes four sublayers: (1) a copper sublayer that is approximately 3 nm thick, (2) a tantalum sublayer that is approximately 3 nm thick, (3) a ruthenium sublayer that is approximately 5.5 nm thick, and (4) a NiAl sublayer that is approximately 3 nm thick. Thus, the non-magnetic layer 150 is approximately 14.5 nm thick.

The DFG layer 122, which is disposed between and adjacent to the spacer 125 and the non-magnetic layer 150, comprises a first layer 180 comprising CoFe, a second layer 182 comprising CoMnGe, and a third layer 187 comprising CoFe. For example, the first layer 180 may comprise $Co_{50}Fe_{50}$, the second layer 182 may comprise $Co_{53}Mn_{23}Ge_{24}$, and the third layer 187 may comprise $Co_{50}Fe_{50}$. In the embodiment shown in FIG. 9D, the first layer 180, which abuts the spacer 125, is about 0.5 nm thick; the second layer 182 is about 1.5 nm thick; and the third layer 187, which abuts the non-magnetic layer 150, is about 0.5 nm thick. Therefore, the DFG layer 122 of the exemplary embodiment illustrated in FIG. 9D is approximately 2.5 nm thick.

The spacer 125, which is disposed between and adjacent to the magnetic notch 140 and the DFG layer 122, comprises copper and is approximately 3 nm thick.

The magnetic notch 140, which is disposed between and adjacent to the trailing shield 130 and the spacer 125, comprises FeCo and is approximately 5 nm thick. In some embodiments, the magnetic notch 140 comprises $Fe_{70}Co_{30}$.

The trailing shield 130 abuts the magnetic notch 140. In the exemplary embodiment illustrated in FIG. 9D, the trailing shield 130 comprises FeCo. For example, the trailing shield 130 may comprise $Fe_{70}CO_{30}$.

The effective write gap 190 of the exemplary embodiment illustrated in FIG. 9D, which comprises the spacer 125, the DFG layer 122, and the non-magnetic layer 150, is approximately 20 nm thick.

Figure 9E:
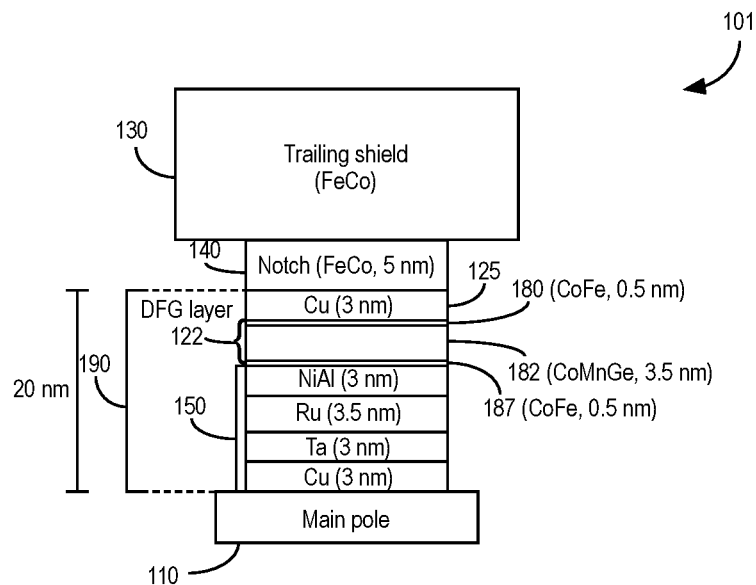
FIG. 9E is a view of the ABS of another exemplary TS-integrated writer in accordance with some embodiments.

FIG. 9E is a view of the ABS 105 of an exemplary TS-integrated writer 101 in accordance with some embodiments. Like the TS-integrated writers 101 shown in FIGS. 9A through 9D, the exemplary writer 101 illustrated in FIG. 9E includes a main pole 110, a non-magnetic layer 150, a DFG layer 122, a spacer 125, the magnetic notch 140, and a trailing shield 130.

The non-magnetic layer 150 is disposed between and adjacent to the main pole 110 and the DFG layer. In the embodiment illustrated in FIG. 9E, the non-magnetic layer 150 includes four sublayers: (1) a copper sublayer that is approximately 3 nm thick, (2) a tantalum sublayer that is approximately 3 nm thick, (3) a ruthenium sublayer that is approximately 3.5 nm thick, and (4) a NiAl sublayer that is approximately 3 nm thick. Thus, the non-magnetic layer 150 is approximately 12.5 nm thick.

The DFG layer 122, which is disposed between and adjacent to the spacer 125 and the non-magnetic layer 150, comprises a first layer 180 comprising CoFe, a second layer 182 comprising CoMnGe, and a third layer 187 comprising CoFe. For example, the first layer 180 may comprise $Co_{50}Fe_{50}$, the second layer 182 may comprise $Co_{53}Mn_{23}Ge_{24}$, and the third layer 187 may comprise $Co_{50}Fe_{50}$. In the embodiment shown in FIG. 9E, the first layer 180, which abuts the spacer 125, is about 0.5 nm thick; the second layer 182 is about 3.5 nm thick; and the third layer 187, which abuts the non-magnetic layer 150, is about 0.5 nm thick. Therefore, the DFG layer 122 of the exemplary embodiment illustrated in FIG. 9E is approximately 4.5 nm thick.

The spacer 125, which is disposed between and adjacent to the magnetic notch 140 and the DFG layer 122, comprises copper and is approximately 3 nm thick.

The magnetic notch 140, which is disposed between and adjacent to the trailing shield 130 and the spacer 125, comprises FeCo and is approximately 5 nm thick. In some embodiments, the magnetic notch 140 comprises $Fe_{70}Co_{30}$.

The trailing shield 130 abuts the magnetic notch 140. In the exemplary embodiment illustrated in FIG. 9E, the trailing shield 130 comprises FeCo. For example, the trailing shield 130 may comprise $Fe_{70}CO_{30}$.

The effective write gap 190 of the exemplary embodiment illustrated in FIG. 9E, which comprises the spacer 125, the DFG layer 122, and the non-magnetic layer 150, is approximately 20 nm thick.

Figure 9F:
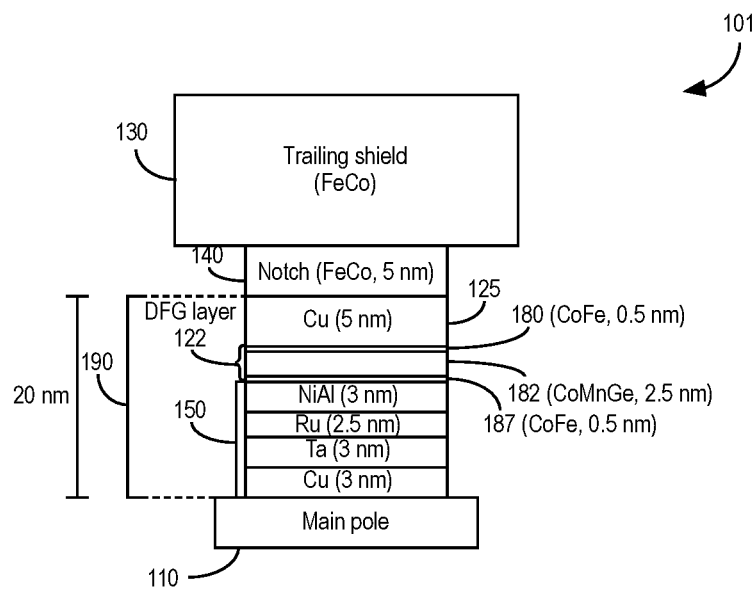
FIG. 9F is a view of the ABS of another exemplary TS-integrated writer in accordance with some embodiments.

FIG. 9F is a view of the ABS 105 of an exemplary TS-integrated writer 101 in accordance with some embodiments. Like the TS-integrated writers 101 shown in FIGS. 9A through 9E, the exemplary writer 101 illustrated in FIG. 9F includes a main pole 110, a non-magnetic layer 150, a DFG layer 122, a spacer 125, the magnetic notch 140, and a trailing shield 130.

The non-magnetic layer 150 is disposed between and adjacent to the main pole 110 and the DFG layer 122. In the embodiment illustrated in FIG. 9F, the non-magnetic layer 150 includes four sublayers: (1) a copper sublayer that is approximately 3 nm thick, (2) a tantalum sublayer that is approximately 3 nm thick, (3) a ruthenium sublayer that is approximately 2.5 nm thick, and (4) a NiAl sublayer that is approximately 3 nm thick. Thus, the non-magnetic layer 150 is approximately 11.5 nm thick.

The DFG layer 122, which is disposed between and adjacent to the non-magnetic layer 150 and the spacer 125, comprises a first layer 180 comprising CoFe, a second layer 182 comprising CoMnGe, and a third layer comprising CoFe. For example, the first layer 180 may comprise $Co_{50}Fe_{50}$, the second layer 182 may comprise $Co_{53}Mn_{23}Ge_{24}$, and the third layer 187 may comprise $Co_{50}Fe_{50}$. In the embodiment shown in FIG. 9F, the first layer 180, which abuts the spacer 125, is about 0.5 nm thick; the second layer 182 is about 2.5 nm thick; and the third layer 187, which abuts the non-magnetic layer 150, is about 0.5 nm thick. Therefore, the DFG layer 122 of the exemplary embodiment illustrated in FIG. 9F is approximately 3.5 nm thick.

The spacer 125, which is disposed between and adjacent to the magnetic notch 140 and the DFG layer 122, comprises copper and is approximately 5 nm thick in the exemplary embodiment illustrated in FIG. 9F.

The magnetic notch 140, which is disposed between and adjacent to the trailing shield 130 and the spacer 125, comprises FeCo and is approximately 5 nm thick. In some embodiments, the magnetic notch 140 comprises $Fe_{70}Co_{30}$.

The trailing shield 130 abuts the magnetic notch 140. In the exemplary embodiment illustrated in FIG. 9F, the trailing shield 130 comprises FeCo. For example, the trailing shield 130 may comprise $Fe_{70}CO_{30}$.

The effective write gap 190 of the exemplary embodiment illustrated in FIG. 9F, which comprises the spacer 125, the DFG layer 122, and the non-magnetic layer 150, is approximately 20 nm thick.

It is to be understood that although FIGS. 8A through 8J and FIGS. 9A through 9F illustrate various layers in contact with each other (e.g., the spacer 125 is illustrated as abutting the magnetic notch 140, the DFG layer 122 is shown abutting the non-magnetic layer 150, etc.), these embodiments are simply exemplary. Additional layers may be included between the main pole 110 and the trailing shield 130 without departing from the spirit of this disclosure.

Figure 10:
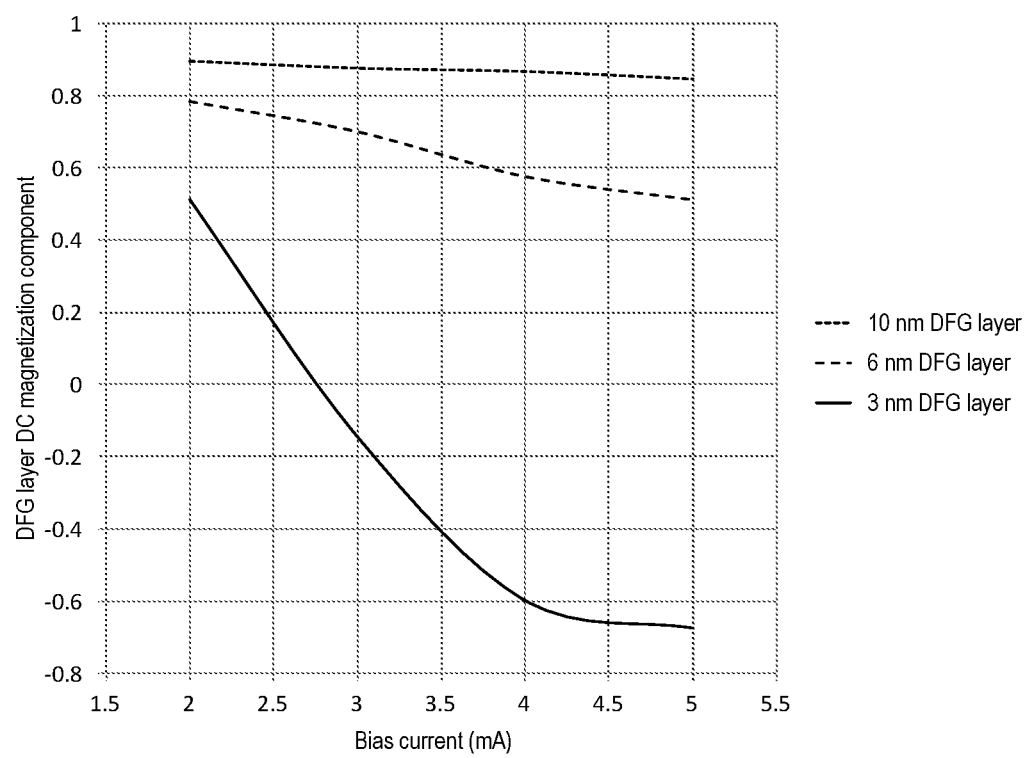
FIG. 10 shows an exemplary DFG layer DC magnetization component as a function of the applied bias current under a first set of simulation conditions.

FIG. 10 shows the DC component of an exemplary DFG layer magnetization 124 of the writer 101 as a function of the applied bias current. Specifically, FIG. 10 illustrates the impact of the thickness of an exemplary DFG layer 122 on the performance of the writer 101. The plots in FIG. 10 indicate that under the imposed simulation conditions, if the DFG layer 122 is too thick, e.g., in the particular embodiment used to generate FIG. 10, either 10 nm or 6 nm, the DFG layer DC magnetization component that results from the application of a bias current up to about 5 mA is positive and aligns with the gap field, and therefore the DFG layer DC field component 123 detracts from the write field 115 in the media. But when the DFG layer 122 is thin enough, e.g., 3 nm thick in the particular embodiment used to generate FIG. 10, the DFG layer 122 achieves a precession angle approaching −45 degrees when the bias current is in the range of about 4.5-5 mA. Thus, the 3 nm DFG layer 122 produces a negative DFG layer DC magnetization component, and hence a DFG layer DC field component 123, that reinforces, rather than degrades, the write field 115 in the media. The plots of FIG. 10 indicate that there is a limit to how thick the DFG layer 122 may be to provide the benefits described herein, because bias current is generally limited by the reliability of the head. The precise thickness limit depends on many material parameters, and changes for different components, but the primary point of FIG. 10 is that there is a limit to how thick the DFG layer 122 can be. As discussed in the context of FIG. 11 below, different simulation conditions illustrate that the DFG layer 122 thickness can be greater than 3 nm and provide the beneficial behavior described herein.

In addition to the DFG layer 122 thickness, the magnetic moment of the DFG layer 122 also affects the performance of the writer 101. The magnitude of the DFG layer DC field component 123 is proportional to the magnetic moment of the DFG layer 122. Larger DFG layer 122 magnetization and thicker DFG layers 122 result in larger magnetic fields, but they may decrease the performance of the DFG layer 122 in terms of fast, stable, single-domain oscillations with DC components opposing the gap field, especially in the case of lower bias currents. Damping may also be important. The embodiments illustrated in FIGS. 9A through 9F have an advantage in damping reduction because of the conventional seed layer used in the design. Polarization likely plays secondary role. Thus, optimization of the thickness and magnetic moment of the DFG layer 122 corresponding to available bias current in heads may be desirable to optimize performance of a writer 101. FIGS. 8A through 8J and FIGS. 9A through 9F provide several exemplary embodiments of writers 101 with DFG layers 122 having different thicknesses and compositions for optimizing the damping factor, available bias current, saturation magnetization of the DFG layer 122, and the required bias current to flip the DC magnetization component of the DFG layer 122 to oppose the gap field Hgap 170. For example, FIG. 8J has a thick DFG layer 122; in the case that the bias current is high enough to flip the DC component of the DFG layer magnetization 124, a large DC field component is obtained. In contrast, FIG. 9B or 9D has a thinner DFG layer 122, requiring a lower bias current to flip the DC component of the DFG layer magnetization 124, which is better for reliability. The expected DFG layer DC field component 123 from a thin layer is limited, however.

Micromagnetic modeling of an integrated writer and DFG layer 122 indicates that a DFG layer 122 having a thickness of 3 nm and a magnetic moment of 1.3 Tesla achieves an approximately −45 degree precession angle with slightly noisy oscillations, whereas a DFG layer 122 having a thickness of 3 nm and a magnetic moment of 0.6 Tesla achieves an approximately −90 degree precession angle with nearly ideal performance.

Both experiments and theoretical modeling indicate that a writer 101 with a 3 nm DFG layer 122 having a magnetic moment of 1.3 Tesla provides a gain in areal density capacity of approximately 5% relative to a conventional PMR writer. This gain is a result of smaller transition jitter (due to larger field gradient) and larger low-frequency signal-to-noise ratio (LFSNR) due to larger write field magnitude.

Figure 11:
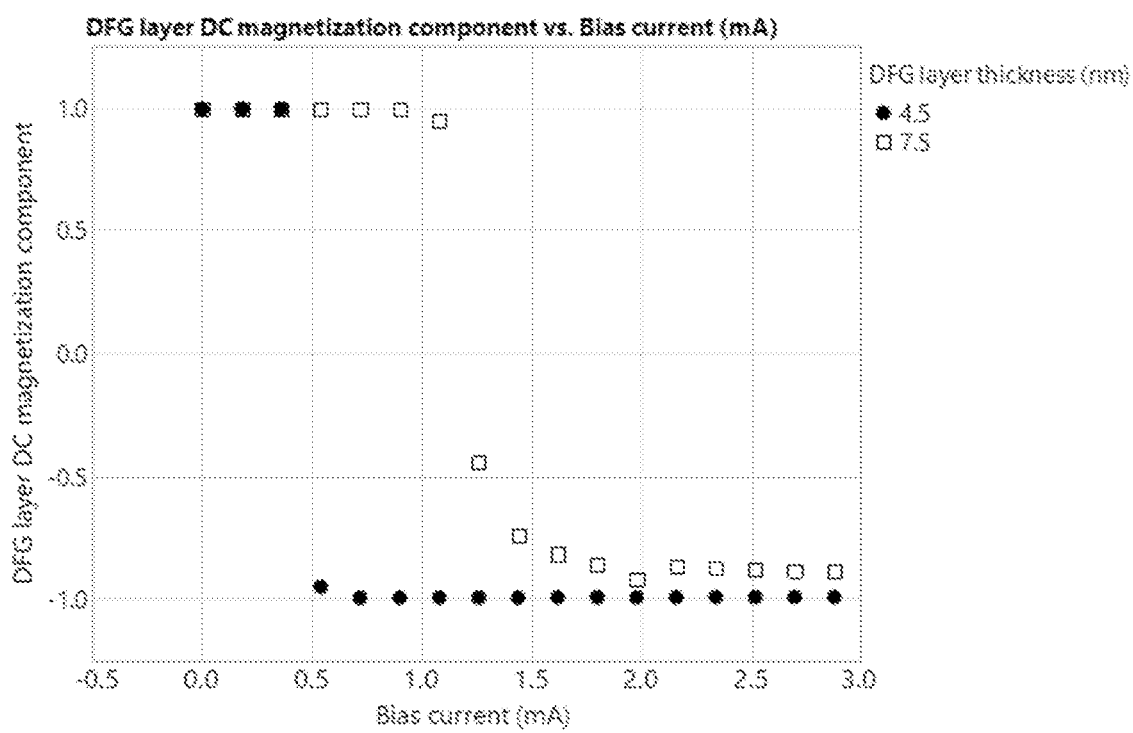
FIG. 11 shows an exemplary DFG layer DC magnetization component as a function of the applied bias current under a second set of simulation conditions.

FIG. 11 shows an exemplary DFG layer 122 DC magnetization component as a function of the applied bias current under a second set of simulation conditions for two DFG layer 122 thicknesses: 4.5 nm and 7.5 nm. As the plot indicates, under the imposed simulation conditions, both the 4.5 nm and 7.5 nm DFG layers 122 achieve a precession angle approaching −45 degrees at some bias current (e.g., approximately 0.5 mA for the 4.5 nm DFG layer 122 and approximately 1.25 mA for the 7.5 nm DFG layer 122). Thus, both DFG layers 122 produce a negative DFG layer DC magnetization component, and hence a DFG layer DC field component 123, that reinforces, rather than degrades, the write field 115 in the media. The results shown in FIG. 11 emphasize the point that the limit on how thick the DFG layer 122 can be depends on design choices as described herein.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components (e.g., of a disk drive) are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used herein, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to." The terms "exemplary" and "embodiment" are used to express examples, not preferences or requirements.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The drawings are not necessarily to scale, and the dimensions, shapes, and sizes of the features may differ substantially from how they are depicted in the drawings. Moreover, as explained above, certain dimensions, such as thicknesses of the DFG layer 122, spacer 125, non-magnetic layer 150, and magnetic notch 140, are given in the direction that is perpendicular to gap surfaces of the main pole 110 and trailing shield 130. If the main pole 110 and trailing shield 130 gap surfaces are not perpendicular to the ABS, but instead are slanted or tapered at some angle $\theta$, then the thicknesses of these layers, and of the effective write gap 190, along the ABS 105 will be larger by a factor of $1/\cos(\theta)$ than the thickness in the direction perpendicular to the gap surfaces of the main pole 110 and the trailing shield 130.

Moreover, certain exemplary materials have been described herein as suitable for the DFG layer 122, spacer 125, non-magnetic layer 150, and magnetic notch 140. It is to be understood that other suitable materials (e.g., magnetic or non-magnetic) may be used instead or in addition. Similarly, although exemplary dimensions (e.g., thickness, height, width) have been described, it is to be understood that other dimensions outside of the exemplary ranges described herein may be suitable. As explained, the benefits described herein can be obtained using the design guidelines and principles provided herein.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A data storage device, comprising:
   at least one recording media;
   a write head for writing to the at least one recording media, the write head comprising:
   a main pole,
   a trailing shield,
   a magnetic notch adjacent to either the trailing shield or the main pole,
   a non-magnetic spacer situated between the main pole and the trailing shield,
   a non-magnetic layer situated between the main pole and the trailing shield, and
   a magnetic DC-field-generation (DFG) layer adjacent to the non-magnetic spacer and situated between the non-magnetic spacer and the non-magnetic layer, wherein the magnetic DFG layer is the only magnetic layer between the main pole and the trailing shield that is not adjacent to the main pole or the trailing shield;

a first conducting line for providing a write current to the main pole;
a second conducting line for providing a bias current to the magnetic DFG layer; and
signal processing circuitry coupled to the first and second conducting lines and configured to control the write current and the bias current,
wherein a polarization and a spin diffusion length of the magnetic notch are selected such that, in operation, the magnetic notch provides spin-torque to align a DC component of a magnetization of the DFG layer in a direction that is substantially opposite to a gap field direction, and wherein the polarization exceeds a threshold polarization value and the spin diffusion length is less than a threshold spin diffusion length value.

2. The data storage device recited in claim 1, wherein the magnetic notch is a first magnetic notch adjacent to the trailing shield, and further comprising a second magnetic notch adjacent to the main pole.

3. The data storage device recited in claim 1, wherein:
a width of the magnetic notch is substantially identical to a width of the DFG layer, and
a height of the magnetic notch is substantially identical to a height of the DFG layer.

4. The data storage device recited in claim 1, wherein at least one of a width of the magnetic notch or a height of the magnetic notch is less than about 50 nm.

5. The data storage device recited in claim 1, wherein the magnetic notch comprises at least two layers.

6. The data storage device recited in claim 1, wherein (a) the magnetic notch is adjacent to the trailing shield and is disposed between the trailing shield and the non-magnetic spacer, or (b) the magnetic notch is adjacent to the main pole and is disposed between the main pole and the non-magnetic spacer.

7. The data storage device recited in claim 6, wherein the trailing shield and the magnetic notch are made of identical materials or the main pole and the magnetic notch are made of identical materials.

8. The data storage device recited in claim 1, wherein a thickness of an effective write gap of the write head, the effective write gap including the non-magnetic spacer, the non-magnetic layer, the magnetic notch, and the magnetic DFG layer, is between approximately 15 nm and approximately 25 nm.

9. A data storage device, comprising:
at least one recording media;
a write head for writing to the at least one recording media, the write head comprising:
a main pole,
a trailing shield,
a magnetic notch adjacent to either the trailing shield or the main pole,
a non-magnetic spacer situated between the main pole and the trailing shield,
a non-magnetic layer situated between the main pole and the trailing shield, and
a magnetic DC-field-generation (DFG) layer adjacent to the non-magnetic spacer and situated between the non-magnetic spacer and the non-magnetic layer, wherein the magnetic DFG layer is the only magnetic layer between the main pole and the trailing shield that is not adjacent to the main pole or the trailing shield;
a first conducting line for providing a write current to the main pole;
a second conducting line for providing a bias current to the magnetic DFG layer; and
signal processing circuitry coupled to the first and second conducting lines and configured to control the write current and the bias current,
wherein a damping of the magnetic notch is selected such that, in operation, the magnetic notch provides spin-torque to align a DC component of a magnetization of the DFG layer in a direction that is substantially opposite to a gap field direction, and wherein the damping exceeds a threshold damping value.

10. The data storage device recited in claim 9, wherein the magnetic notch is a first magnetic notch adjacent to the trailing shield, and further comprising a second magnetic notch adjacent to the main pole.

11. The data storage device recited in claim 9, wherein:
a width of the magnetic notch is substantially identical to a width of the DFG layer, and
a height of the magnetic notch is substantially identical to a height of the DFG layer.

12. The data storage device recited in claim 9, wherein at least one of a width of the magnetic notch or a height of the magnetic notch is less than about 50 nm.

13. The data storage device recited in claim 9, wherein the magnetic notch comprises at least two layers.

14. The data storage device recited in claim 9, wherein (a) the magnetic notch is adjacent to the trailing shield and is disposed between the trailing shield and the non-magnetic spacer, or (b) the magnetic notch is adjacent to the main pole and is disposed between the main pole and the non-magnetic spacer.

15. The data storage device recited in claim 14, wherein the trailing shield and the magnetic notch are made of identical materials or the main pole and the magnetic notch are made of identical materials.

16. The data storage device recited in claim 9, wherein a thickness of an effective write gap of the write head, the effective write gap including the non-magnetic spacer, the non-magnetic layer, the magnetic notch, and the magnetic DFG layer, is between approximately 15 nm and approximately 25 nm.

17. The data storage device recited in claim 9, wherein (a) the magnetic notch is adjacent to the trailing shield and is disposed between the trailing shield and the non-magnetic spacer, or (b) the magnetic notch is adjacent to the main pole and is disposed between the main pole and the non-magnetic spacer.

18. The data storage device recited in claim 17, wherein the trailing shield and the magnetic notch are made of identical materials or the main pole and the magnetic notch are made of identical materials.

19. A data storage device, comprising:
at least one recording media;
a write head for writing to the at least one recording media, the write head comprising:
a main pole,
a trailing shield,
a magnetic notch adjacent to either the trailing shield or the main pole,
a non-magnetic spacer situated between the main pole and the trailing shield,
a non-magnetic layer situated between the main pole and the trailing shield, and
a magnetic DC-field-generation (DFG) layer adjacent to the non-magnetic spacer and situated between the non-magnetic spacer and the non-magnetic layer, wherein the magnetic DFG layer is the only magnetic layer between the main pole and the trailing shield that is not adjacent to the main pole or the trailing shield;

a first conducting line for providing a write current to the main pole;

a second conducting line for providing a bias current to the magnetic DFG layer; and signal processing circuitry coupled to the first and second conducting lines and configured to control the write current and the bias current, wherein a resistivity of the magnetic notch is selected such that, in operation, the magnetic notch provides spin-torque to align a DC component of a magnetization of the DFG layer in a direction that is substantially opposite to a gap field direction, and wherein the resistivity is less than a threshold resistivity value.

20. The data storage device recited in claim 19, wherein the magnetic notch is a first magnetic notch adjacent to the trailing shield, and further comprising a second magnetic notch adjacent to the main pole.

21. The data storage device recited in claim 19, wherein:
a width of the magnetic notch is substantially identical to a width of the DFG layer, and
a height of the magnetic notch is substantially identical to a height of the DFG layer.

22. The data storage device recited in claim 19, wherein at least one of a width of the magnetic notch or a height of the magnetic notch is less than about 50 nm.

23. The data storage device recited in claim 19, wherein the magnetic notch comprises at least two layers.

24. The data storage device recited in claim 20, wherein a thickness of an effective write gap of the write head, the effective write gap including the non-magnetic spacer, the non-magnetic layer, the magnetic notch, and the magnetic DFG layer, is between approximately 15 nm and approximately 25 nm.

* * * * *